United States Patent
Ramesh et al.

(10) Patent No.: US 11,829,301 B2
(45) Date of Patent: Nov. 28, 2023

(54) ACCELERATION CIRCUITRY FOR POSIT OPERATIONS

(71) Applicant: Micron Technology, Inc., Boise, ID (US)

(72) Inventors: Vijay S. Ramesh, Boise, ID (US); Phillip G. Hays, Anacortes, WA (US); Craig M. Cutler, Monroe, WA (US); Andrew J. Rees, Redmond, WA (US)

(73) Assignee: Micron Technology, Inc., Boise, ID (US)

(*) Notice: Subject to any disclaimer, the term of this patent is extended or adjusted under 35 U.S.C. 154(b) by 483 days.

(21) Appl. No.: 16/857,753

(22) Filed: Apr. 24, 2020

(65) Prior Publication Data

US 2021/0334219 A1  Oct. 28, 2021

(51) Int. Cl.
| | | |
|---|---|---|
| *G06F 12/00* | (2006.01) | |
| *G06F 12/1081* | (2016.01) | |
| *G06F 12/02* | (2006.01) | |
| *G06F 13/16* | (2006.01) | |
| *G06F 7/544* | (2006.01) | |
| *G06F 9/38* | (2018.01) | |
| *G06F 9/30* | (2018.01) | |
| *G06F 13/42* | (2006.01) | |

(52) U.S. Cl.
CPC ........ *G06F 12/1081* (2013.01); *G06F 7/5443* (2013.01); *G06F 9/3001* (2013.01); *G06F 9/3893* (2013.01); *G06F 12/0246* (2013.01); *G06F 13/1673* (2013.01); *G06F 13/4221* (2013.01)

(58) Field of Classification Search
CPC .............................. G06N 3/08; G06F 12/1081
USPC ........................................................ 711/154
See application file for complete search history.

(56) References Cited

U.S. PATENT DOCUMENTS

| | | | |
|---|---|---|---|
| 4,758,972 A | | 7/1988 | Frazier |
| 5,634,076 A | * | 5/1997 | Garde ................. G06F 15/7857 709/212 |
| 6,150,836 A | * | 11/2000 | Abbott ............. H03K 19/17736 326/38 |
| 7,865,541 B1 | | 1/2011 | Langhammer |
| 8,020,142 B2 | * | 9/2011 | Wolrich ............. G06F 9/30014 717/161 |

(Continued)

OTHER PUBLICATIONS

Gustafson, et al., "Beating Floating Point as its Own Game: Posit Arithmetic", Research Paper, retrieved from <http://www.johngustafson.net/pdfs/BeatingFloatingPoint.pdf>, Jan. 2017, 16 pages.

*Primary Examiner* — Titus Wong
(74) *Attorney, Agent, or Firm* — Brooks, Cameron & Huebsch, PLLC

(57) ABSTRACT

Systems, apparatuses, and methods related to acceleration circuitry for posit operations are described. A first operand formatted in a universal number or posit format can be received by a first buffer resident on acceleration circuitry. A second operand formatted in a universal number or posit format can be received by a second buffer resident on the acceleration circuitry. An arithmetic operation, a logical operation, or both can be performed using processing circuitry resident on the acceleration circuitry using the first operand and the second operand. A result of the arithmetic operation, the logical operation, or both can be received by a third buffer resident on the acceleration circuitry.

26 Claims, 11 Drawing Sheets

(56) References Cited

U.S. PATENT DOCUMENTS

| | | | |
|---|---|---|---|
| 8,214,417 B2 | 7/2012 | Ahmed | |
| 2006/0294059 A1* | 12/2006 | Chamberlain | G06F 21/76 |
| 2008/0082303 A1* | 4/2008 | Bowers | G06F 30/20 |
| | | | 703/2 |
| 2010/0076915 A1* | 3/2010 | Xu | G06N 3/063 |
| | | | 706/25 |
| 2011/0184844 A1* | 7/2011 | Parsons | G06Q 40/00 |
| | | | 705/35 |
| 2012/0271854 A1* | 10/2012 | Truong | G06F 21/41 |
| | | | 707/E17.005 |
| 2013/0061060 A1* | 3/2013 | Thekkath | G06F 21/629 |
| | | | 713/189 |
| 2015/0220483 A1* | 8/2015 | Hayes | G06F 7/483 |
| | | | 708/200 |
| 2016/0239263 A1* | 8/2016 | Park | G06F 1/04 |
| 2016/0344629 A1* | 11/2016 | Gray | H04L 49/106 |
| 2016/0350077 A1* | 12/2016 | Peeters | G06F 7/72 |

\* cited by examiner

ACCELERATION CIRCUITRY FOR POSIT OPERATIONS

TECHNICAL FIELD

The present disclosure relates generally to semiconductor memory and methods, and more particularly, to apparatuses, systems, and methods for acceleration circuitry for posit operations.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
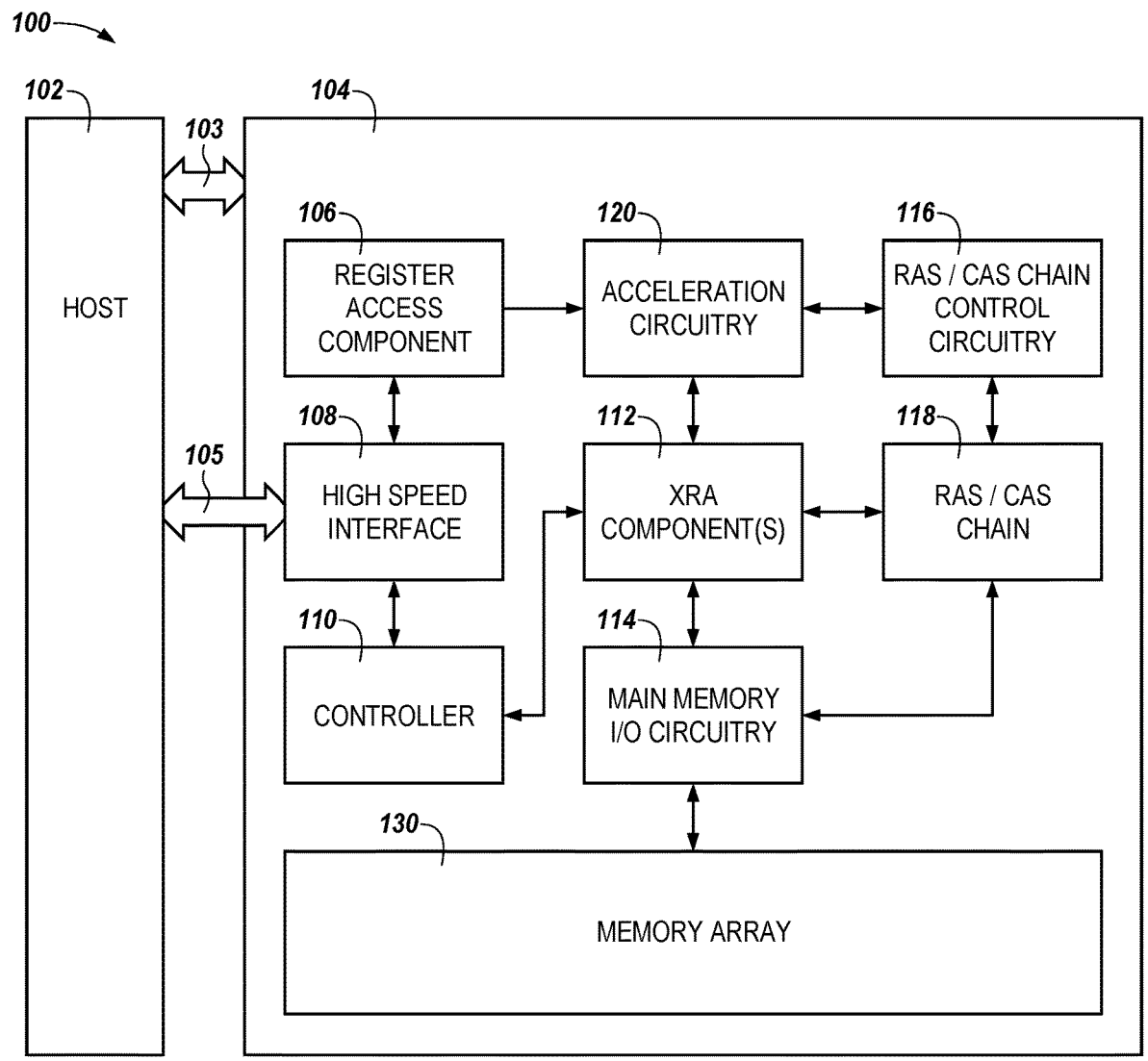
FIG. 1 is another functional block diagram in the form of a computing system including an apparatus including a host and a memory device in accordance with a number of embodiments of the present disclosure.

Systems, apparatuses, and methods related to acceleration circuitry for posit operations are described. Universal number (unum) bit strings, such as posit bit string operands and posit bit strings representing results of arithmetic and/or logical operations performed using the posit bit string operands may be stored in a memory resource, such as a memory array or other memory resource. Circuitry deployed in a memory device may access the memory resource to retrieve the unum bit string operands and/or the results of the arithmetic and/or logical operations performed using the unum bit string operands from the memory resource. For instance, an arithmetic operation and/or a logical operation may be performed using a first unum bit string stored in the memory resource and a second unum bit string stored in the memory resource. The result of the arithmetic operation and/or the logical operation may be stored in the memory resource and subsequently retrieved.

Computing systems may perform a wide range of operations that can include various calculations, which can require differing degrees of accuracy. However, computing systems have a finite amount of memory in which to store operands on which calculations are to be performed. In order to facilitate performance of operation on operands stored by a computing system within the constraints imposed by finite memory resources, in some approaches operands are stored in particular formats. One such format is referred to as the "floating-point" format, or "float," for simplicity (e.g., the IEEE 754 floating-point format).

Under the floating-point standard, bit strings (e.g., strings of bits that can represent a number), such as binary number strings, are represented in terms of three sets of integers or sets of bits—a set of bits referred to as a "base," a set of bits referred to as an "exponent," and a set of bits referred to as a "mantissa" (or significand). The sets of integers or bits that define the format in which a binary number string is stored may be referred to herein as an "numeric format," or "format," for simplicity. For example, the three sets of integers of bits described above (e.g., the base, exponent, and mantissa) that define a floating-point bit string may be referred to as a format (e.g., a first format). As described in more detail below, a posit bit string may include four sets of integers or sets of bits (e.g., a sign, a regime, an exponent, and a mantissa), which may also be referred to as a "numeric format," or "format," (e.g., a second format). In addition, under the floating-point standard, two infinities (e.g., +∞ and −∞) and/or two kinds of "NaN" (not-a-number): a quiet NaN and a signaling NaN, may be included in a bit string.

The floating-point standard has been used in computing systems for a number of years and defines arithmetic formats, interchange formats, rounding rules, operations, and exception handling for computation carried out by many computing systems. Arithmetic formats can include binary and/or decimal floating-point data, which can include finite numbers, infinities, and/or special NaN values. Interchange formats can include encodings (e.g., bit strings) that may be used to exchange floating-point data. Rounding rules can include a set of properties that may be satisfied when rounding numbers during arithmetic operations and/or conversion operations. Floating-point operations can include arithmetic operations and/or other computational operations such as trigonometric functions. Exception handling can include indications of exceptional conditions, such as division by zero, overflows, etc.

An alternative format to floating-point is referred to as a "universal number" (unum) format. There are several forms of unum formats—Type I unums, Type II unums, and Type III unums, which can be referred to as "posits" and/or "valids." Type I unums are a superset of the IEEE 754 standard floating-point format that use a "ubit" at the end of the fraction to indicate whether a real number is an exact float, or if it lies in the interval between adjacent floats. The sign, exponent, and fraction bits in a Type I unum take their definition from the IEEE 754 floating-point format, however, the length of the exponent and fraction fields of Type I unums can vary dramatically, from a single bit to a maximum user-definable length. By taking the sign, exponent, and fraction bits from the IEEE 754 standard floating-point format, Type I unums can behave similar to floating-point numbers, however, the variable bit length exhibited in the exponent and fraction bits of the Type I unum can require additional management in comparison to floats.

Type II unums are generally incompatible with floats, which permits a clean, mathematical design based on projected real numbers. A Type II unum can include n bits and can be described in terms of a "u-lattice" in which quadrants of a circular projection are populated with an ordered set of $2^{n-3}-1$ real numbers. The values of the Type II unum can be reflected about an axis bisecting the circular projection such that positive values lie in an upper right quadrant of the circular projection, while their negative counterparts lie in an upper left quadrant of the circular projection. The lower half of the circular projection representing a Type II unum can include reciprocals of the values that lie in the upper half of the circular projection. Type II unums generally rely on a look-up table (LUT) for most operations. For example, the size of the look-up table can limit the efficacy of Type II unums in some circumstances. However, Type II unums can provide improved computational functionality in comparison with floats under some conditions.

The Type III unum format is referred to herein as a "posit format" or, for simplicity, a "posit." In contrast to floating-point bit strings, posits can, under certain conditions, allow for a broader dynamic range and a higher accuracy (e.g., precision) than floating-point numbers with the same bit width. This can allow for operations performed by a computing system to be performed at a higher rate (e.g., faster) when using posits than with floating-point numbers, which, in turn, can improve the performance of the computing system by, for example, reducing a number of clock cycles used in performing operations thereby reducing processing time and/or power consumed in performing such operations. In addition, the use of posits in computing systems can allow for higher accuracy and/or precision than floating-point numbers, which can further improve the functioning of a computing system in comparison to some approaches (e.g., approaches which rely upon floating-point format bit strings).

Posits can be highly variable in precision and accuracy based on the total quantity of bits and/or the quantity of sets of integers or sets of bits included in the posit. In addition, posits can generate a wide dynamic range. The accuracy, precision, and/or the dynamic range of a posit can be greater than that of a float, or other numerical formats, under certain conditions, as described in more detail herein. The variable accuracy, precision, and/or dynamic range of a posit can be manipulated, for example, based on an application in which a posit will be used. In addition, posits can reduce or eliminate the overflow, underflow, NaN, and/or other corner cases that are associated with floats and other numerical formats. Further, the use of posits can allow for a numerical value (e.g., a number) to be represented using fewer bits in comparison to floats or other numerical formats.

These features can, in some embodiments, allow for posits to be highly reconfigurable, which can provide improved application performance in comparison to approaches that rely on floats or other numerical formats. In addition, these features of posits can provide improved performance in machine learning applications in comparison to floats or other numerical formats. For example, posits can be used in machine learning applications, in which computational performance is paramount, to train a network (e.g., a neural network) with a same or greater accuracy and/or precision than floats or other numerical formats using fewer bits than floats or other numerical formats. In addition, inference operations in machine learning contexts can be achieved using posits with fewer bits (e.g., a smaller bit width) than floats or other numerical formats. By using fewer bits to achieve a same or enhanced outcome in comparison to floats or other numerical formats, the use of posits can therefore reduce an amount of time in performing operations and/or reduce the amount of memory space required in applications, which can improve the overall function of a computing system in which posits are employed.

Embodiments herein are directed to acceleration circuitry for posit operations. In some embodiments, the acceleration circuitry can be implemented on a field programmable gate array (FPGA). Control logic can be coupled to, or a component of, the acceleration circuitry. A Peripheral Component Interconnect Express (PCIe) interface can be coupled to the acceleration circuitry to communicate with a host. For example, the PCIe interface can be used to communicate data (e.g., arrays of data) to local memory coupled to the acceleration circuitry. The local memory can be internal to a memory device including the acceleration circuitry, external to a memory device including the acceleration circuitry, or both. Commands from a host can be communicated to the acceleration circuitry via the PCIe interface. For example, commands from the host can control processing of arrays of data (e.g., performing arithmetic operations, logical operations, or both). Results from processing arrays of data can be written to the local memory. Commands from a host can be interpreted by a processing device coupled to the acceleration circuitry. The processing device can be configured to control retrieval of operands, formatted in a unum or posit format, and communication of results via direct memory access (DMA) controllers, for example. The processing device can be configured to control processing of data by the acceleration circuitry. In some embodiments, the processing device can be a cache coherent reduced instruction set computing device, such as a reduced instruction set computer (RISC) RISC-V device.

Commands from a host can be placed in a queue (e.g., a command buffer described further herein) for the processing device. Non-limiting examples of commands from a host to the processing device can include communicating a block of data from memory of the host to local memory, or vice-versa, and processing data in local memory. The processing device can be configured to process data "in-place."

In some embodiments, a first operand formatted in a unum or posit format can be received by a first buffer resident on acceleration circuitry. As used herein, the term "resident on" refers to something that is physically located on a particular component. For example, the processing unit being "resident on" the memory device refers to a condition in which the processing unit is physically located on the memory device. The term "resident on" can be used interchangeably with other terms such as "deployed on" or "located on," herein. A second operand formatted in the unum or posit format can be received by a second buffer resident on the acceleration circuitry. An arithmetic operation, a logical operation, or both can be performed using processing circuitry resident on the acceleration circuitry using the first operand and the second operand. A result of the arithmetic operation, the logical operation, or both can be transmitted by a third buffer resident on the acceleration circuitry.

In some embodiments, acceleration circuitry can include a DMA controller. The acceleration circuitry can include a first buffer couplable to the DMA controller and configured to store a first operand formatted in a unum or posit forma. The acceleration circuitry can include a second buffer couplable to the DMA controller and configured to store a second operand formatted in the unum or posit format. The acceleration circuitry can include processing circuitry couplable to the first buffer and the second buffer. The processing circuitry can be configured to perform an arithmetic operation, a logical operation, or both using the first operand and the second operand. The acceleration circuitry can include a third buffer couplable to the DMA controller and the computation circuitry. The third buffer can be configured to store a result of the arithmetic operation, the logical operation, or both.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "X," "Y," "N," "J," "R," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things. Furthermore, the words "can" and "may" are used throughout this application in a permissive sense (i.e., having the potential to, being able to), not in a mandatory sense (i.e., must).

The term "include," and derivations thereof, means "including, but not limited to." The terms "coupled" and "coupling" mean to be directly or indirectly connected physically or for access to and movement (transmission) of commands and/or data, as appropriate to the context. The terms "bit string," "data," and "data values" are used interchangeably herein and can have the same meaning, as appropriate to the context. The term "resident on" refers to a condition in which one or more components are physically disposed on one or more different components. Furthermore, the terms "data," "plurality of bits" and "bit string" may be used interchangeably herein, and the term "number" can, depending on the context, refer to a bit string or plurality of bits.

The figures herein follow a numbering convention in which the first digit or digits correspond to the figure number and the remaining digits identify an element or component in the figure. Similar elements or components between different figures may be identified by the use of similar digits. For example, 120 may reference element "20" in FIG. 1, and a similar element may be referenced as 220 in FIG. 2. A group or plurality of similar elements or components may generally be referred to herein with a single element number. For example, a plurality of reference elements 433-1, 433-2, . . . , 433-N may be referred to generally as 433. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is another functional block diagram in the form of a computing system including an apparatus 100 including a host 102 and a memory device 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The acceleration circuitry 120 can be analogous to the acceleration circuitry 220 illustrated in FIGS. 2A and 2B. Similarly, the host 102 can be analogous to the host 102 illustrated in FIGS. 1A and 1B, the memory device 104 can be analogous to the memory device 104 illustrated in FIGS. 1A and 1B, and the memory array 130 can be analogous to the memory array 230 illustrated in FIGS. 2A and 2B. Each of the components (e.g., the host 102, the acceleration circuitry 120, the logic circuitry 122, the memory resource 124, and/or the memory array 130, etc.) can be separately referred to herein as an "apparatus."

The host 102 can be communicatively coupled to the memory device 104 via one or more channels 103, 105. The channels 103, 105 can be interfaces or other physical connections that allow for bit strings, data, and/or commands to be transferred between the host 102 and the memory device 105. For example, commands to cause initiation of an operation (e.g., an operation to convert bit strings in a floating-point format to bit strings in a posit format, as well as subsequent arithmetic and/or logical operations on the bit strings in the posit format) to be performed by the acceleration circuitry 120 can be transferred from the host via the channels 103, 105. It is noted that, in some examples, the acceleration circuitry 120 can perform the operations in response to an initiation command transferred from the host 102 via one or more of the channels 103, 105 in the absence of an intervening command from the host 102. That is, once the acceleration circuitry 120 has received the command to initiate performance of an operation from the host 102, the operations can be performed by the acceleration circuitry 120 in the absence of additional commands from the host 102.

In some embodiments, bit strings (e.g., posit bit strings) can be generated and/or stored in the memory array 130 without encumbering the host 102. For example, the bit strings can be generated and/or stored in the memory array 130 without receiving multiple commands from the host 102. Stated alternatively, in some embodiments, the host 102 can send a single command to the memory device to request performance of an operation using one or more bit strings. Responsive to receipt of the command to request performance of the operation, the memory device 104 (e.g., the controller 110, the acceleration circuitry 120, or other components of the memory device 104) can perform the operation and/or retrieve a stored result of the operation in the absence of additional commands from the host 102. This can reduce traffic across the channels 103/105, which can increase performance of a computing device associated with the host 102 and/or the memory device 104.

As shown in FIG. 1, the memory device 104 can include a register access component 106, a high speed interface (HSI) 108, a controller 110, one or more extended row address (XRA) component(s) 112, main memory input/output (I/O) circuitry 114, row address strobe (RAS)/column address strobe (CAS) chain control circuitry 116, a RAS/CAS chain component 118, acceleration circuitry 120, and a memory array 130. The acceleration circuitry 120 is, as shown in FIG. 1, located in an area of the memory device 104 that is physically distinct from the memory array 130. That is, in some embodiments, the acceleration circuitry 120 is located in a periphery location of the memory array 130.

The register access component 106 can facilitate transferring and fetching of bit strings from the host 102 to the memory device 104 and from the memory device 104 to the host 102. For example, the register access component 106 can store addresses (or facilitate lookup of addresses), such as memory addresses, that correspond to bit strings that are to be transferred to the host 102 form the memory device 104 or transferred from the host 102 to the memory device 104. In some embodiments, the register access component 106 can facilitate transferring and fetching bit strings that are to be operated upon by the acceleration circuitry 120 and/or the register access component 106 can facilitate transferring and fetching bit strings that have been operated upon by the acceleration circuitry 120 for transfer to the host 102.

The HSI 108 can provide an interface between the host 102 and the memory device 104 for bit strings, commands, and/or data traversing the channel 105. The HSI 108 can be a double data rate (DDR) interface such as a DDR3, DDR4, DDR5, etc. interface. Embodiments are not limited to a DDR interface, however, and the HSI 108 can be a quad data rate (QDR) interface, peripheral component interconnect (PCI) interface (e.g., a peripheral component interconnect express (PCIe)) interface, or other suitable interface for transferring bit strings, commands, and/or data between the host 102 and the memory device 104.

The controller 110 can be responsible for executing instructions from the host 102 and accessing the acceleration circuitry 120 and/or the memory array 130. The controller 110 can be a state machine, a sequencer, or some other type of controller. The controller 110 can receive commands from the host 102 (via the HSI 108, for example) and, based on the received commands, control operation of the acceleration circuitry 120 and/or the memory array 130. In some embodiments, the controller 110 can receive a command from the host 102 to cause performance of an operation using the acceleration circuitry 120. Responsive to receipt of such a command, the controller 110 can instruct the acceleration circuitry 120 to begin performance of the operation(s).

In a non-limiting example, the controller 110 can instruct the acceleration circuitry 120 to perform an operation to retrieve one or more bit strings stored in the memory array 130 and/or a resultant bit string stored in the memory array 130 that represents a result of an operation performed between the one or more bit strings. For example, the controller can receive a command from the host 104 requesting performance of an operation between one or more bit strings and send a command to the acceleration circuitry 120 to perform the operation. The acceleration circuitry 120 (e.g., a state machine resident on the acceleration circuitry 120 such as the state machine 223 illustrated in FIG. 2B, herein) can determine if a result of the requested operation is stored in the memory array 130, determine an address in the memory array 130 at which the result of the requested operation is stored, and/or retrieve the result of the requested operation from the memory array 130. The acceleration circuitry 120 and/or the controller 110 can then cause the result of the requested operation to be transferred to the host 102 or to other circuitry external to the memory array 130.

In some embodiments, the controller 110 can be a global processing controller and may provide power management functions to the memory device 104. Power management functions can include control over power consumed by the memory device 104 and/or the memory array 130. For example, the controller 110 can control power provided to various banks of the memory array 130 to control which banks of the memory array 130 are operational at different times during operation of the memory device 104. This can include shutting certain banks of the memory array 130 down while providing power to other banks of the memory array 130 to optimize power consumption of the memory device 130. In some embodiments, the controller 110 controlling power consumption of the memory device 104 can include controlling power to various cores of the memory device, for example, to the acceleration circuitry 120, etc.

The XRA component(s) 112 are intended to provide additional functionalities (e.g., peripheral amplifiers) that sense (e.g., read, store, cache) data values of memory cells in an array and that are distinct from the memory array 130. The XRA components 112 can include latches and/or registers. For example, additional latches can be included in an "XRA component 112." The latches of the XRA component 112 can be located on a periphery of the memory array 130 (e.g., on a periphery of one or more banks of memory cells) of the memory device 104.

The main memory input/output (I/O) circuitry 114 can facilitate transfer of bit strings, data, and/or commands to and from the memory array 130. For example, the main memory I/O circuitry 114 can facilitate transfer of bit strings, data, and/or commands from the host 102 and/or the acceleration circuitry 120 to and from the memory array 130. In some embodiments, the main memory I/O circuitry 114 can include one or more direct memory access (DMA) components that can transfer bit strings, blocks of data, etc. from the acceleration circuitry 120 to the memory array 130, and vice versa.

In some embodiments, the main memory I/O circuitry 114 can facilitate transfer of one or more bit strings from the memory array 130 to the acceleration circuitry 120 so that the acceleration circuitry 120 can perform operations on the bit string(s). Similarly, the main memory I/O circuitry 114 can facilitate transfer of bit strings that have had one or more operations performed on it by the acceleration circuitry 120 to the memory array 130. As described in more detail herein, the operations can include operations to convert bit strings formatted according to the floating-point standard to bit strings formatted as a posit (and vice versa), arithmetic operations performed on the bit strings formatted as a posit, logical operations performed on the bit strings formatted as a posit, etc.

As described above, posit bit strings (e.g., the data) can be stored and/or retrieved from the memory array 130. In some embodiments, the main memory I/O circuitry 114 can facilitate storing and/or retrieval of the posit bit strings to and/or from the memory array 130. For example, the main memory I/O circuitry 114 can be enabled to transfer posit bit strings to the memory array 130 to be stored, and/or the main memory I/O circuitry 114 can facilitate retrieval of the posit bit strings (e.g., posit bit strings representing a performed operation between one or more posit bit string operands) from the memory array 130 in response to, for example, a command from the controller 110 and/or the acceleration circuitry 120.

The row address strobe (RAS)/column address strobe (CAS) chain control circuitry 116 and the RAS/CAS chain component 118 can be used in conjunction with the memory array 130 to latch a row address and/or a column address to initiate a memory cycle. In some embodiments, the RAS/CAS chain control circuitry 116 and/or the RAS/CAS chain component 118 can resolve row and/or column addresses of the memory array 130 at which read and write operations associated with the memory array 130 are to be initiated or terminated. For example, upon completion of an operation using the acceleration circuitry 120, the RAS/CAS chain control circuitry 116 and/or the RAS/CAS chain component 118 can latch and/or resolve a specific location in the memory array 130 to which the bit strings that have been operated upon by the acceleration circuitry 120 is to be stored. Similarly, the RAS/CAS chain control circuitry 116 and/or the RAS/CAS chain component 118 can latch and/or resolve a specific location in the memory array 130 from which bit strings are to be transferred to the acceleration circuitry 120 prior to the acceleration circuitry 120 performing an operation on the bit strings.

In some embodiments, the RAS/CAS chain control circuitry 116 and the RAS/CAS chain component 118 can be used in conjunction with the memory array 130 to latch a row address and/or a column address to initiate an operation to retrieve one or more bit strings from the memory array 130. For example, responsive to the acceleration circuitry 120 (e.g., the state machine 123 illustrated in FIG. 1B and resident on the acceleration circuitry 120) requesting a bit string stored at a particular address of the memory array 130, the RAS/CAS chain control circuitry 116 and the RAS/CAS chain component 118 can latch a row address and/or a column address corresponding to the bit string(s) to facilitate retrieval of the requested bit string(s) from the memory array 130.

As described in connection with FIGS. 2A and 2B and in more detail below in connection with FIG. 5, the acceleration circuitry 120 can be configured to receive a bit string having a first format (e.g., a bit string in a floating-point format), convert the bit string to a second format (e.g., convert the bit string to a universal number format such as a posit format), and/or cause performance of operations such as arithmetic and/or logical operations using the bit string(s) having the second format. In some embodiments, the acceleration circuitry 120 can cause the bit string(s) having the second format and/or the bit string(s) that include a result of the arithmetic and/or logical operation to be stored in a data structure (e.g. the data structure 634 illustrated in FIG. 6, herein) of the memory array 130.

Figure 2A:
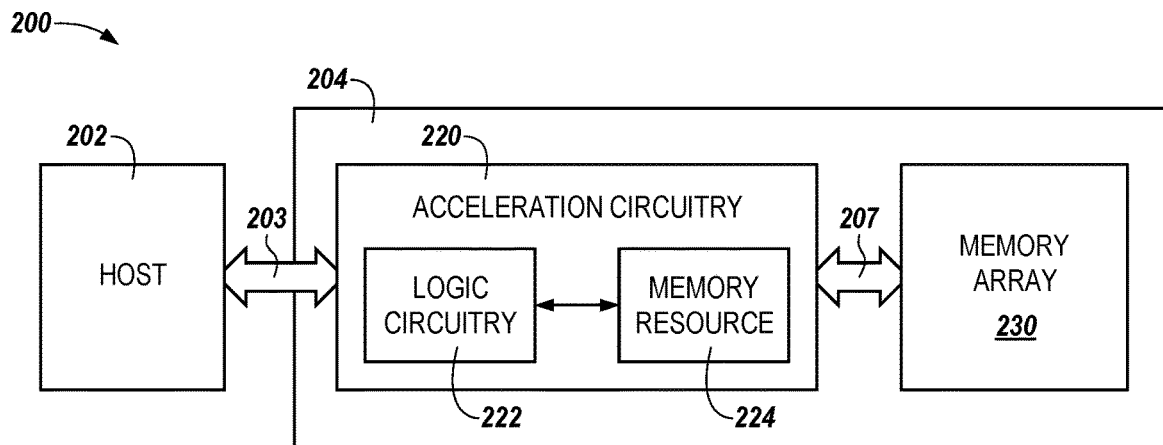
FIG. 2A is a functional block diagram in the form of a computing system including an apparatus including a host and a memory device in accordance with a number of embodiments of the present disclosure.
Figure 2B:
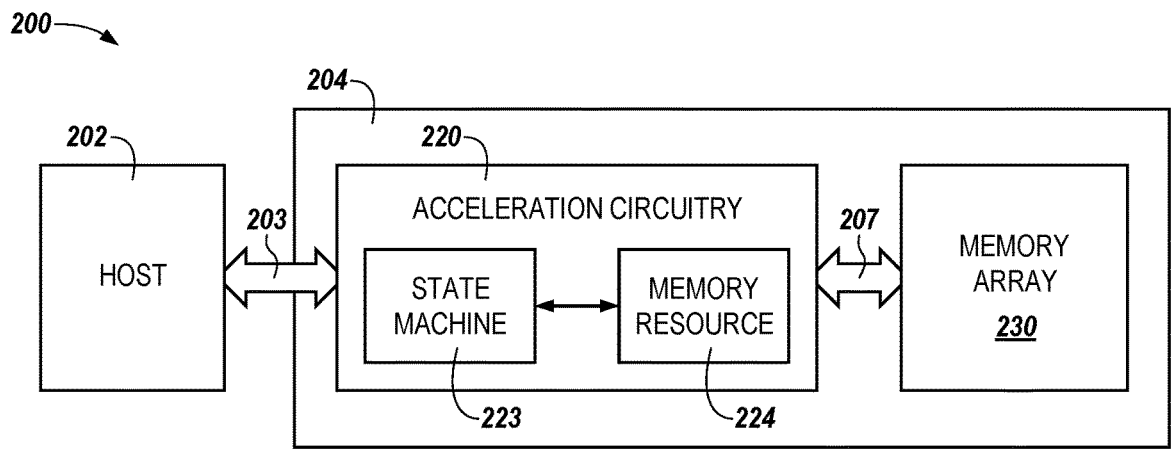
FIG. 2B is another functional block diagram in the form of a computing system including an apparatus including a host and a memory device in accordance with a number of embodiments of the present disclosure.

The acceleration circuitry 120 can include logic circuitry (e.g., the logic circuitry 222 illustrated in FIGS. 2A and 2B) and memory resource(s) (e.g., the memory resource 224 illustrated in FIGS. 2A and 2B). Bit strings can be received by the acceleration circuitry 120 from, for example, the host 102 and/or the memory array 130, and stored by the acceleration circuitry 120, for example in the memory resource of the acceleration circuitry 120. The acceleration circuitry (e.g., the logic circuitry of the acceleration circuitry 120) can perform operations (or cause operations to be performed on) the bit strings, as described in more detail in connection with FIG. 5, herein.

As described in more detail in connection with FIGS. 3 and 4A-4B, posits can provide improved accuracy and may require less storage space (e.g., may contain a smaller number of bits) than corresponding bit strings represented in the floating-point format. Accordingly, by converting the floating-point bit strings to posit bit strings using the acceleration circuitry 120, performance of the memory device 102 may be improved in comparison to approaches that utilize only floating-point bit strings because operations may be performed more quickly on the posit bit strings (e.g., because the bit strings in the posit format are smaller and therefore requires less time and/or processing resources to perform operations on) and because less memory space is required in the memory device 102 to store the bit strings in the posit format, which can free up additional space in the memory device 102 for other bit strings, data and/or other operations to be performed. Further, by storing and subsequently retrieving bit strings in a data structure of a memory array 130, the bit strings can be subsequently accessed quickly for use in other operations and/or for use by applications running, for example, on the host 102 in a more efficient manner than in approaches that require performance of arithmetic and/or logical operations each time a result of such an operation is requested. Moreover, fewer clock cycles may be required to perform arithmetic and/or logical operations than in some approaches because results of arithmetic and/or logical operations between bit string operands may be retrieved from the memory array 130 in contrast to approaches in which the operations between the bit string operands are performed each time a result of such an operation is requested.

The acceleration circuitry 120 can perform (or cause performance of) arithmetic and/or logical operations on the resultant posit bit strings. The arithmetic operations can include addition, subtraction, multiplication, division, fused multiply addition, multiply-accumulate, dot product units, greater than or less than, absolute value (e.g., FABS( ), fast Fourier transforms, inverse fast Fourier transforms, sigmoid function, convolution, square root, exponent, and/or rectified linear unit (ReLu), as well as trigonometric operations such as sine, cosine, tangent, etc., while the logical operations can include AND, OR, XOR, NOT, etc. As will be appreciated, the foregoing list of operations is not intended to be exhaustive, nor is the foregoing list of operations intended to be limiting, and the acceleration circuitry 120 may be configured to perform (or cause performance of) other arithmetic and/or logical operations. As described herein, the operands (e.g., bit string operands) used in such operations and/or the results of such operations may be stored in the memory array 130 and may be subsequently retrieved from the memory array 130 in response to a command from the acceleration circuitry 120.

In some embodiments, the acceleration circuitry 120 may perform the above-listed operations in conjunction with execution of one or more machine learning algorithms. For example, the acceleration circuitry 120 may perform operations related to one or more neural networks. Neural networks may allow for an algorithm to be trained over time to determine an output response based on input signals. For example, over time, a neural network may essentially learn to better maximize the chance of completing a particular goal. This may be advantageous in machine learning applications because the neural network may be trained over time with new data to achieve better maximization of the chance of completing the particular goal. In many, a neural network may be trained over time to improve operation of particular tasks and/or particular goals.

However, in some approaches, machine learning (e.g., neural network training) may be processing intensive (e.g., may consume large amounts of computer processing resources) and/or may be time intensive (e.g., may require lengthy calculations that consume multiple cycles to be performed). In contrast, by performing such operations using the acceleration circuitry 120, for example, by performing such operations on bit strings that have been converted by the acceleration circuitry 120 into a posit format, the amount of processing resources and/or the amount of time consumed in performing the operations may be reduced in comparison to approaches in which such operations are performed using bit strings in a floating-point format. Further, by storing the results of operations on bit strings that have been converted into the posit format in the memory array 130 for subsequent retrieval, the amount of processing resources and/or the amount of time consumed in performing the operations may be even further reduced for subsequent requests for the results because the operation has already been performed.

The memory array 130 can be a DRAM array, SRAM array, STT RAM array, PCRAM array, TRAM array, RRAM array, NAND flash array, and/or NOR flash array, for instance, although embodiments are not limited to these particular examples. The memory array 130 can function as main memory for the computing system 100 shown in FIG. 1. In some embodiments, the memory array 130 can be configured to store bit strings operated on by the acceleration circuitry 120 (e.g., resultant bit strings) and/or store bit strings to be transferred to the acceleration circuitry 120.

In some embodiments, the memory array 130 is configured to store a plurality of bit strings to be used as operands in performance of an arithmetic operation or a logical operation, or both. Th controller 110, which is coupled to the memory array 130 can be configured to receive a request for the arithmetic operation or the logical operation, or both, to be performed using one or more bit strings. The request may be received from circuitry external to the memory device 104, such as the host 102. The controller 110 can be configured to determine a bit size of the one or more bit strings to be used in performance of the arithmetic operation or the logical operation and, responsive to a determination that performance of the arithmetic operation or the logical operation, or both, requires that the bit size of the one or more bit strings is less than a predetermined bit size, cause performance of the arithmetic operation or the logical operation, or both, using bit strings among the plurality of bit strings stored in the memory array 130.

The controller 110, which is coupled to the memory array 130 and the acceleration circuitry 120, can, in some embodiments, be configured responsive to a determination that performance of the arithmetic operation or the logical operation, or both, requires that the bit size of the one or more bit strings is greater than the predetermined bit size, send a command to the acceleration circuitry to cause the acceleration circuitry to perform the arithmetic operation or the logical operation, or both. In some embodiments, the predetermined bit size can be 16-bits or less, however, embodiments are not limited to a particular bit size.

As described in more detail, herein, the acceleration circuitry 120 can be configured to convert a bit string representing a result of the arithmetic operation or the logical operation, or both, to a format different than the format of the plurality of bit strings stored in the memory array 130. For example, the plurality of bit strings to be used as operands in performance of the arithmetic operation or the logical operation, or both, are stored in a data structure in the memory array 130.

FIG. 2A is a functional block diagram in the form of a computing system 200 including an apparatus including a host 202 and a memory device 204 in accordance with a number of embodiments of the present disclosure. The memory device 204 can include a one or more memory modules (e.g., single in-line memory modules, dual in-line memory modules, etc.). The memory device 204 can include volatile memory and/or non-volatile memory. In a number of embodiments, memory device 204 can include a multi-chip device. A multi-chip device can include a number of different memory types and/or memory modules. For example, a memory system can include non-volatile or volatile memory on any type of a module. In addition, each of the components (e.g., the host 202, the acceleration circuitry 220, the logic circuitry 222, the memory resource 224, and/or the memory array 230) can be separately referred to herein as an "apparatus." Although not explicitly shown in FIG. 2A, the memory device 204 can be coupled to one or more media devices, such as solid-state drive(s), flash media devices, etc.

The memory device 204 can provide main memory for the computing system 200 or could be used as additional memory or storage throughout the computing system 200. The memory device 204 can include one or more memory arrays 230 (e.g., arrays of memory cells), which can include volatile and/or non-volatile memory cells. The memory array 230 can be a flash array with a NAND architecture, for example. Embodiments are not limited to a particular type of memory device. For instance, the memory device 204 can include RAM, ROM, DRAM, SDRAM, PCRAM, RRAM, and flash memory, among others.

In embodiments in which the memory device 204 includes non-volatile memory, the memory device 204 can include flash memory devices such as NAND or NOR flash memory devices. Embodiments are not so limited, however, and the memory device 204 can include other non-volatile memory devices such as non-volatile random-access memory devices (e.g., NVRAM, ReRAM, FeRAM, MRAM, PCM), "emerging" memory devices such as variable resistance (e.g., 3-D Crosspoint (3D XP) memory devices), memory devices that include an array of self-selecting memory (SSM) cells, etc., or combinations thereof. Variable resistance memory devices can perform bit storage based on a change of bulk resistance, in conjunction with a stackable cross-gridded data access array. Additionally, in contrast to many flash-based memories, variable resistance non-volatile memory can perform a write in-place operation, where a non-volatile memory cell can be programmed without the non-volatile memory cell being previously erased. In contrast to flash-based memories and variable resistance memories, self-selecting memory cells can include memory cells that have a single chalcogenide material that serves as both the switch and storage element for the memory cell.

As illustrated in FIG. 2A, a host 202 can be coupled to the memory device 204. In a number of embodiments, the memory device 204 can be coupled to the host 202 via one or more channels (e.g., channel 203). In FIG. 2A, the memory device 204 is coupled to the host 202 via channel 203 and acceleration circuitry 220 of the memory device 204 is coupled to the memory array 230 via a channel 207. The host 202 can be a host system such as a personal laptop computer, a desktop computer, a digital camera, a smart phone, a memory card reader, and/or internet-of-thing enabled device, among various other types of hosts, and can include a memory access device, e.g., a processor (or processing device). One of ordinary skill in the art will appreciate that "a processor" can intend one or more processors, such as a parallel processing system, a number of coprocessors, etc.

The host 202 can include a system motherboard and/or backplane and can include a number of processing resources (e.g., one or more processors, microprocessors, or some other type of controlling circuitry). The system 200 can include separate integrated circuits or both the host 202, the memory device 204, and the memory array 230 can be on the same integrated circuit. The system 200 can be, for instance, a server system and/or a high-performance computing (HPC) system and/or a portion thereof. Although the example shown in FIG. 2A illustrates a system having a Von Neumann architecture, embodiments of the present disclosure can be implemented in non-Von Neumann architectures, which may not include one or more components (e.g., central processing unit (CPU), arithmetic logic unit (ALU), etc.) often associated with a Von Neumann architecture.

The memory device 204 can include acceleration circuitry 220, which can include logic circuitry 222 and a memory resource 224. The logic circuitry 222 can be provided in the form of an integrated circuit, such as an application-specific integrated circuit (ASIC), field programmable gate array (FPGA), system-on-a-chip, or other combination of hardware and/or circuitry that is configured to perform operations described in more detail, herein. For example, the logic circuitry 222 can be configured to receive one or more bit strings in a first format (e.g., a plurality of bits in a floating-point format), convert the one or more bit strings to a second format (e.g., encode the plurality of bits in a posit format), and/or cause performance of operations such as arithmetic and/or logical operations using the one or more bit strings having the second format. As used herein, the bit string(s) in the second format (e.g., the bit string(s) in the posit format) include at least one bit referred to as a "sign," a set of bits referred to as a "regime," a set of bits referred to as an "exponent," and a set of bits referred to as a "mantissa" (or significand). Examples of the sign, regime, exponent, and mantissa sets of bits are described in more detail in connection with FIGS. 3 and 4A-4B, herein.

The operations can include conversion operations to convert floating-point bit strings (e.g., floating-point numbers) to bit strings in a posit format, and vice versa. Once the floating-point bit strings are converted to bit strings in the posit format, the logic circuitry 222 can be configured to perform (or cause performance of) arithmetic operations and/or operations using the posit bit strings. The arithmetic operations can include addition, subtraction, multiplication, division, fused multiply addition, multiply-accumulate, dot product units, greater than or less than, absolute value (e.g., FABS( )), fast Fourier transforms, inverse fast Fourier transforms, sigmoid function, convolution, square root, exponent, and/or rectified linear unit (ReLu), as well as trigonometric operations such as sine, cosine, tangent, etc., while the logical operation can include logical operations such as AND, OR, XOR, NOT, etc. As will be appreciated, the foregoing list of operations is not intended to be exhaustive, nor is the foregoing list of operations intended to be limiting, and the logic circuitry 222 may be configured to perform (or cause performance of) other arithmetic and/or logical operations.

The logic circuitry 222 can include an ALU. The ALU can include circuitry (e.g., hardware, logic, one or more processing devices, etc.) to perform operations (e.g., arithmetic operations, logical operations, bitwise operations, etc.) such as the operations described above, on integer binary bit strings, such as bit strings in the posit format.

The acceleration circuitry 220 can further include a memory resource 224, which can be communicatively coupled to the logic circuitry 222. The memory resource 224 can include volatile memory resource, non-volatile memory resources, or a combination of volatile and non-volatile memory resources. In some embodiments, the memory resource can be a random-access memory (RAM) such as static random-access memory (SRAM). Embodiments are not so limited, however, and the memory resource can be a cache, one or more registers, NVRAM, ReRAM, FeRAM, MRAM, PCM), "emerging" memory devices such as the variable resistance memory devices describe above, etc., or combinations thereof.

The acceleration circuitry 220 can be communicatively coupled to the memory array 230 via one or more channels 207. The memory array 230 can be a DRAM array, SRAM array, STT RAM array, PCRAM array, TRAM array, RRAM array, NAND flash array, and/or NOR flash array, for instance. The array 230 can comprise memory cells arranged in rows coupled by access lines, which may be referred to herein as word lines or select lines, and columns coupled by sense lines, which may be referred to herein as data lines or digit lines. Although a single array 230 is shown in FIG. 2A, embodiments are not so limited. For instance, memory device 204 a number of memory arrays 230 (e.g., a number of banks of DRAM cells, NAND flash cells, etc.).

The embodiment of FIG. 2A can include additional circuitry that is not illustrated so as not to obscure embodiments of the present disclosure. For example, the memory device 204 can include address circuitry to latch address signals provided over I/O connections through I/O circuitry. Address signals can be received and decoded by a row decoder and a column decoder to access the memory device 204 and/or the memory array 230. It will be appreciated by those skilled in the art that the number of address input connections can depend on the density and architecture of the memory device 204 and/or the memory array 230.

FIG. 2B is another functional block diagram in the form of a computing system including an apparatus 200 including a host 202 and a memory device 204 in accordance with a number of embodiments of the present disclosure. As shown in FIG. 2B, the apparatus 200 can include a host 202, which can be communicatively coupled to a memory device 204 via a communication path 203. The memory device 204 can include acceleration circuitry 220, which can include a state machine 223 and, optionally, a memory resource 224. The acceleration circuitry 220 can be communicatively coupled to a memory array 230 via a communication path 207. Each of the components (e.g., the host 202, the acceleration circuitry 220, the state machine 223, the memory resource 224, and/or the memory array 230) can be separately referred to herein as an "apparatus."

In the embodiment shown in FIG. 2B where the logic circuitry 222 comprises a state machine 223, the state machine 223 can be configured to execute a specified set of instructions to, for example, write, read, copy, and/or erase bit strings (e.g., data) stored in the memory array 230. For example, as described in more detail, herein, the state machine 223 can execute instructions to read data from one or more rows and/or columns of the memory array 230 to retrieve data stored in the memory array 230. As described in more detail in connection with FIG. 1, inter alia, the data can include one or more posit bit string operands and/or one or more results of operations (e.g., arithmetic and/or logical operations)

By utilizing a state machine 223 configured to execute a specified set of instructions to write and/or retrieve posit bit strings from the memory array 230, improved memory device 204 performance may be realized in comparison to some approaches since an amount of time consuming and/or computing resource intensive processes to perform operations between posit bit strings stored in the memory array 230 may be reduced by storing the result(s) of such operations in the memory array 230 and retrieving the result(s) of the operations directly from the memory array 230.

In some embodiments, the state machine 223 can determine an address in the memory array 230 in which a relevant posit bit string is stored. For example, the state machine 223 can determine a row and/or column address in the memory array 230 in which one or more posit bit string operands are stored and/or a row and/or column address in which a resultant posit bit string that represents performance of an arithmetic and/or logical operation between the one or more posit bit string operands are stored. The state machine 223 can then send a command or request to retrieve the posit bit string(s) that are stored at the addresses in the memory array 230 and/or cause the retrieved posit bit string(s) to be transferred to the host 202, a media device (e.g., a solid-state drive, flash memory device, etc.) coupled to the memory device 202, or to other circuitry external to the memory array 230.

Figure 3:
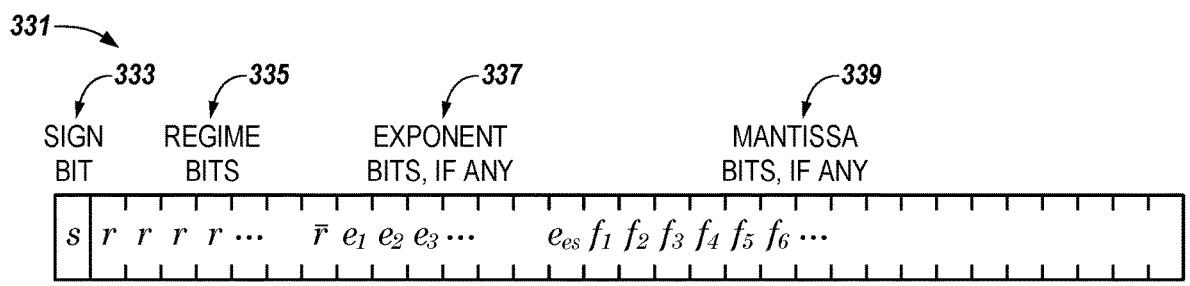
FIG. 3 is an example of an n-bit posit with es exponent bits.

FIG. 3 is an example of an n-bit universal number, or "unum" with es exponent bits. In the example of FIG. 3, the n-bit unum is a posit bit string 331. As shown in FIG. 3, the n-bit posit 331 can include a set of sign bit(s) (e.g., a sign bit 333), a set of regime bits (e.g., the regime bits 335), a set of exponent bits (e.g., the exponent bits 337), and a set of mantissa bits (e.g., the mantissa bits 339). The mantissa bits 339 can be referred to in the alternative as a "fraction portion" or as "fraction bits," and can represent a portion of a bit string (e.g., a number) that follows a decimal point.

The sign bit 333 can be zero (0) for positive numbers and one (1) for negative numbers. The regime bits 335 are described in connection with Table 1, below, which shows (binary) bit strings and their related numerical meaning, k. In Table 1, the numerical meaning, k, is determined by the run length of the bit string. The letter x in the binary portion of Table 1 indicates that the bit value is irrelevant for determination of the regime, because the (binary) bit string is terminated in response to successive bit flips or when the end of the bit string is reached. For example, in the (binary) bit string 0010, the bit string terminates in response to a zero flipping to a one and then back to a zero. Accordingly, the last zero is irrelevant with respect to the regime and all that is considered for the regime are the leading identical bits and the first opposite bit that terminates the bit string (if the bit string includes such bits).

TABLE 1

| Binary | 0000 | 0001 | 001X | 01XX | 10XX | 110X | 1110 | 1111 |
|---|---|---|---|---|---|---|---|---|
| Numerical (k) | −4 | −3 | −2 | −1 | 0 | 1 | 2 | 3 |

In FIG. 3, the regime bits 335 r correspond to identical bits in the bit string, while the regime bits 335 r̄ correspond to an opposite bit that terminates the bit string. For example, for the numerical k value −2 shown in Table 1, the regime bits r correspond to the first two leading zeros, while the regime bit(s) r̄ correspond to the one. As noted above, the final bit corresponding to the numerical k, which is represented by the X in Table 1 is irrelevant to the regime.

If m corresponds to the number of identical bits in the bit string, if the bits are zero, k=−m. If the bits are one, then k=m−1. This is illustrated in Table 1 where, for example, the (binary) bit string 10XX has a single one and k=m−1=1−1=0. Similarly, the (binary) bit string 0001 includes three zeros so k=−m=−3. The regime can indicate a scale factor of useed$^k$, where useed=$2^{2^{es}}$. Several example values for used are shown below in Table 2.

TABLE 2

| es | 0 | 1 | 2 | 3 | 4 |
|---|---|---|---|---|---|
| used | 2 | $2^2 = 4$ | $4^2 = 16$ | $16^2 = 256$ | $256^2 = 65536$ |

The exponent bits 337 correspond to an exponent e, as an unsigned number. In contrast to floating-point numbers, the exponent bits 337 described herein may not have a bias associated therewith. As a result, the exponent bits 337 described herein may represent a scaling by a factor of $2^e$. As shown in FIG. 3, there can be up to es exponent bits ($e_1$, $e_2$, $e_3$, ..., $e_{es}$), depending on how many bits remain to right of the regime bits 335 of the n-bit posit 331. In some embodiments, this can allow for tapered accuracy of the n-bit posit 331 in which numbers which are nearer in magnitude to one have a higher accuracy than numbers which are very large or very small. However, as very large or very small numbers may be utilized less frequent in certain kinds of operations, the tapered accuracy behavior of the n-bit posit 331 shown in FIG. 3 may be desirable in a wide range of situations.

The mantissa bits 339 (or fraction bits) represent any additional bits that may be part of the n-bit posit 331 that lie to the right of the exponent bits 337. Similar to floating-point bit strings, the mantissa bits 339 represent a fraction f, which can be analogous to the fraction 1f where f includes one or more bits to the right of the decimal point following the one. In contrast to floating-point bit strings, however, in the n-bit posit 331 shown in FIG. 3, the "hidden bit" (e.g., the one) may always be one (e.g., unity), whereas floating-point bit strings may include a subnormal number with a "hidden bit" of zero (e.g., 0,f).

Figure 4A:
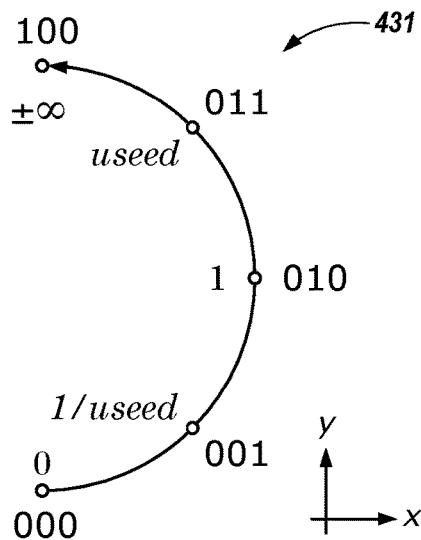
FIG. 4A is an example of positive values for a 3-bit posit.

FIG. 4A is an example of positive values for a 3-bit posit. In FIG. 4A, only the right half of projective real numbers, however, it will be appreciated that negative projective real numbers that correspond to their positive counterparts shown in FIG. 4A can exist on a curve representing a transformation about the y-axis of the curves shown in FIG. 4A.

In the example of FIG. 4A, es=2, so useed=$2^{2^{es}}$=16. The precision of a posit 431-1 can be increased by appending bits the bit string, as shown in FIG. 4B. For example, appending a bit with a value of one (1) to bit strings of the posit 431-1 increases the accuracy of the posit 431-1 as shown by the posit 431-2 in FIG. 4B. Similarly, appending a bit with a value of one to bit strings of the posit 431-2 in FIG. 4B increases the accuracy of the posit 431-2 as shown by the posit 431-3 shown in FIG. 4B. An example of interpolation rules that may be used to append bits to the bits strings of the posits 431-1 shown in FIG. 4A to obtain the posits 431-2, 431-3 illustrated in FIG. 4B follow.

If maxpos is the largest positive value of a bit string of the posits 431-1, 431-2, 431-3 and minpos is the smallest value of a bit string of the posits 431-1, 431-2, 431-3, maxpos may be equivalent to useed and minpos may be equivalent to $$\frac{1}{useed}.$$

Between maxpos and ±∞, a new bit value may be maxpos*useed, and between zero and minpos, a new bit value may be $$\frac{minpos}{useed}.$$

These new bit values can correspond to a new regime bit 335. Between existing values x=$2^m$ and y=$2^n$, where m and n differ by more than one, the new bit value may be given by the geometric mean:

$$\sqrt{x \times y} = 2^{\frac{(m+n)}{2}},$$

which corresponds to a new exponent bit 337. If the new bit value is midway between the existing x and y values next to it, the new bit value can represent the arithmetic mean $$\frac{x+y}{2},$$

which corresponds to a new mantissa bit 339.

Figure 4B:
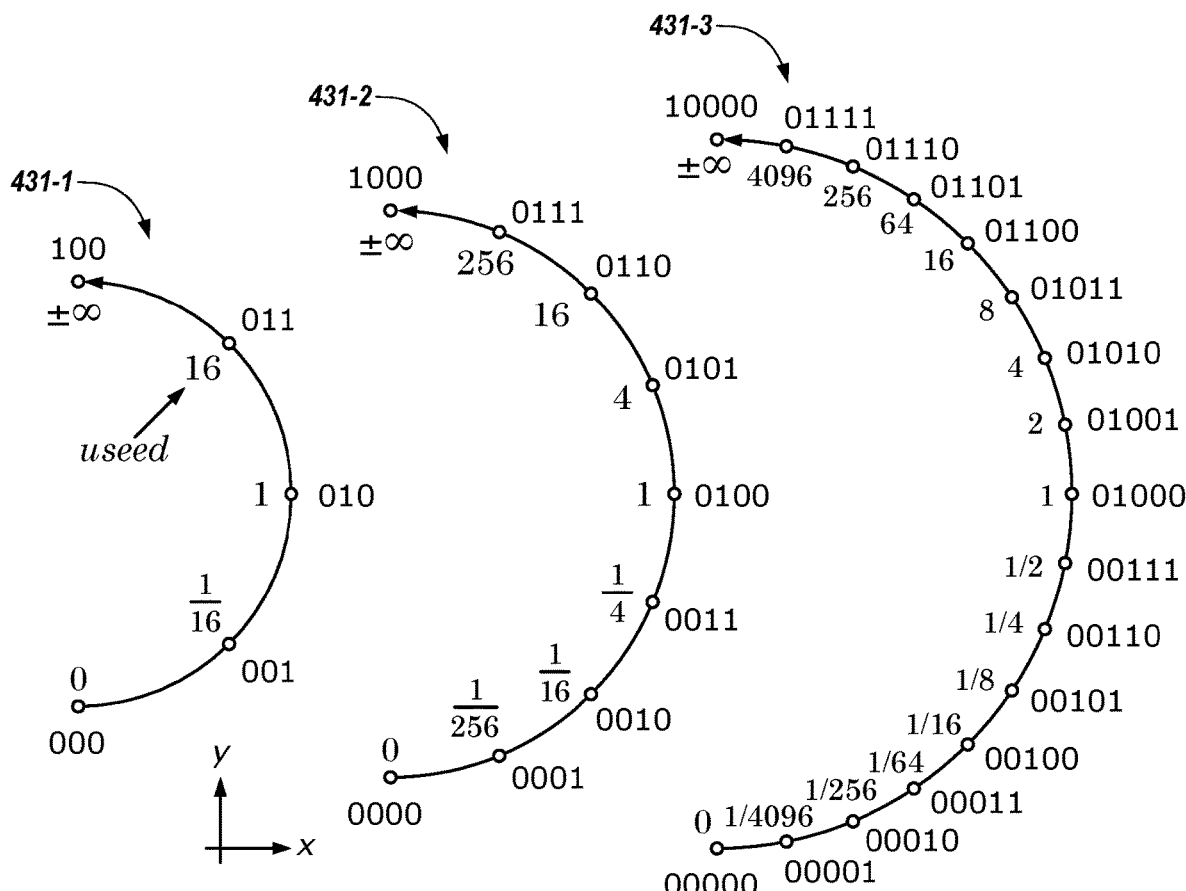
FIG. 4B is an example of posit construction using two exponent bits.

FIG. 4B is an example of posit construction using two exponent bits. In FIG. 4B, only the right half of projective real numbers, however, it will be appreciated that negative projective real numbers that correspond to their positive counterparts shown in FIG. 4B can exist on a curve representing a transformation about the y-axis of the curves shown in FIG. 4B. The posits 431-1, 431-2, 431-3 shown in FIG. 4B each include only two exception values: Zero (0) when all the bits of the bit string are zero and ±∞ when the bit string is a one (1) followed by all zeros. It is noted that the numerical values of the posits 431-1, 431-2, 431-3 shown in FIG. 4 are exactly useed$^k$. That is, the numerical values of the posits 431-1, 431-2, 431-3 shown in FIG. 4 are exactly useed to the power of the k value represented by the regime (e.g., the regime bits 335 described above in connection with FIG. 3). In FIG. 4B, the posit 431-1 has es=2, so useed=$2^{2^{es}}$=16, the posit 431-2 has es=3, so useed=$2^{2^{es}}$=256, and the posit 431-3 has es=4, so useed=$2^{2^{es}}$=4096.

As an illustrative example of adding bits to the 3-bit posit 431-1 to create the 4-bit posit 431-2 of FIG. 4B, the useed=256, so the bit string corresponding to the useed of 256 has an additional regime bit appended thereto and the former useed, 16, has a terminating regime bit ($\bar{r}$) appended thereto. As described above, between existing values, the corresponding bit strings have an additional exponent bit appended thereto. For example, the numerical values 1/16, 1/4, 1, and 4 will have an exponent bit appended thereto. That is, the final one corresponding to the numerical value 4 is an exponent bit, the final zero corresponding o the numerical value 1 is an exponent bit, etc. This pattern can be further seen in the posit 431-3, which is a 5-bit posit generated according to the rules above from the 4-bit posit 431-2. If another bit was added to the posit 431-3 in FIG. 4B to generate a 6-bit posit, mantissa bits 339 would be appended to the numerical values between 1/16 and 16.

A non-limiting example of decoding a posit (e.g., a posit 431) to obtain its numerical equivalent follows. In some embodiments, the bit string corresponding to a posit p is an unsigned integer ranging from $-2^{n-1}$ to $2^{n-1}$, k is an integer corresponding to the regime bits 335 and e is an unsigned integer corresponding to the exponent bits 337. If the set of mantissa bits 339 is represented as $\{f_1 f_2 \ldots f_{fs}\}$ and f is a value represented by 1. $f_1 f_2 \ldots f_{fs}$ (e.g., by a one followed by a decimal point followed by the mantissa bits 339), the p can be given by Equation 1, below.

$$x = \begin{cases} 0, & p = 0 \\ \pm\infty, & p = -2^{n-1} \\ \text{sign}(p) \times useed^k \times 2^e \times f, & \text{all other } p \end{cases} \quad \text{Equation 1}$$

A further illustrative example of decoding a posit bit string is provided below in connection with the posit bit string 0000110111011101 shown in Table 3, below follows.

TABLE 3

| SIGN | REGIME | EXPONENT | MANTISSA |
|---|---|---|---|
| 0 | 0001 | 101 | 11011101 |

In Table 3, the posit bit string 0000110111011101 is broken up into its constituent sets of bits (e.g., the sign bit 333, the regime bits 335, the exponent bits 337, and the mantissa bits 339). Since es=3 in the posit bit string shown in Table 3 (e.g., because there are three exponent bits), useed=256. Because the sign bit 333 is zero, the value of the numerical expression corresponding to the posit bit string shown in Table 3 is positive. The regime bits 335 have a run of three consecutive zeros corresponding to a value of −3 (as described above in connection with Table 1). As a result, the scale factor contributed by the regime bits 335 is $256^{-3}$ (e.g., useed$^k$). The exponent bits 337 represent five (5) as an unsigned integer and therefore contribute an additional scale factor of $2^e=2^5=32$. Lastly, the mantissa bits 339, which are given in Table 3 as 11011101, represent two-hundred and twenty-one (221) as an unsigned integer, so the mantissa bits 339, given above as f are $$f + \frac{221}{256}.$$

Using these values and Equation 1, the numerical value corresponding to the posit bit string given in Table 3 is $$+256^{-3} \times 2^5 \times \left(1 + \frac{221}{256}\right) = \frac{437}{134217728} \approx 3.55393 \times 10^{-6}.$$

Figure 5:
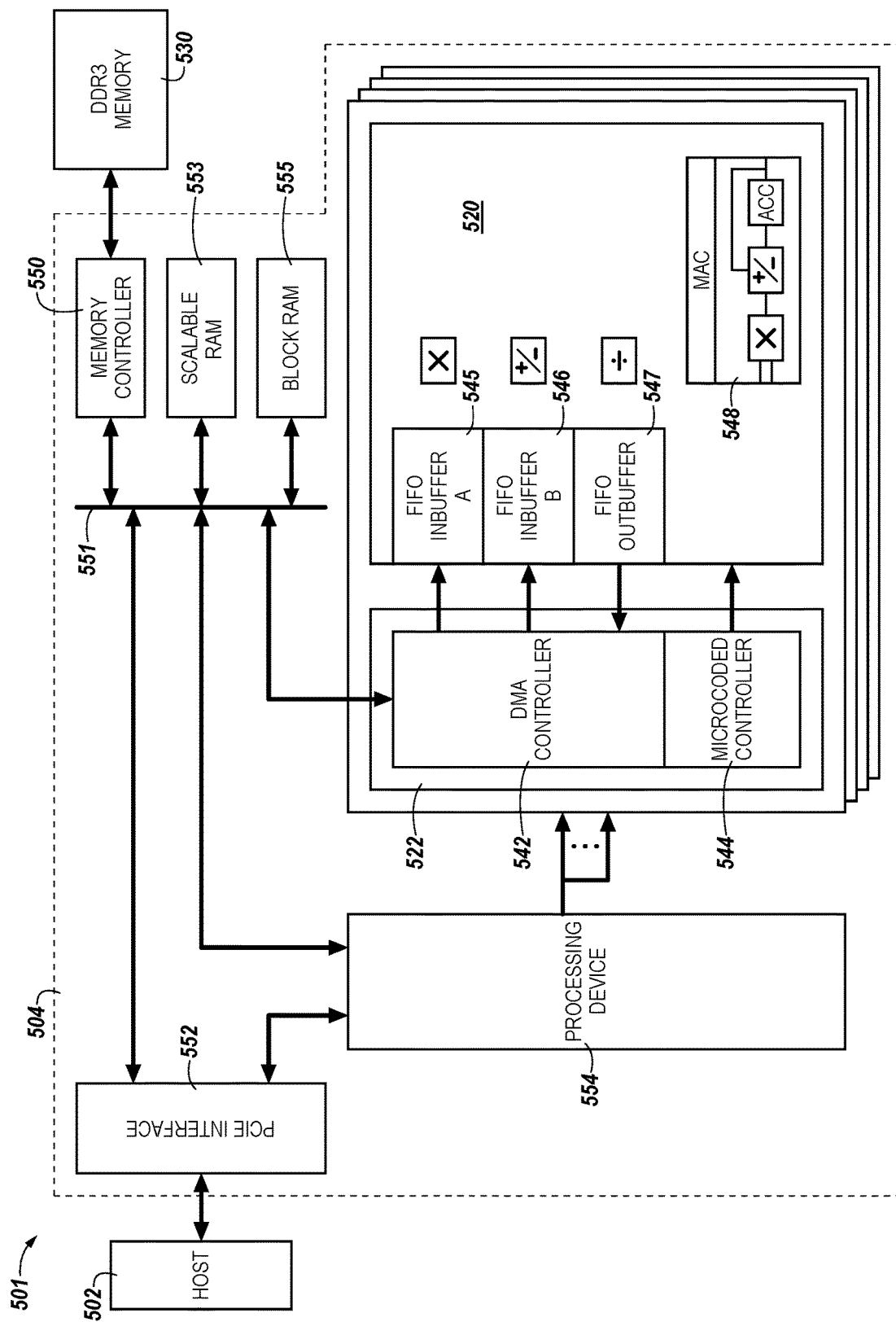
FIG. 5 is another functional block diagram in the form of a computing system including an apparatus including a host and a memory device in accordance with a number of embodiments of the present disclosure.

FIG. 5 is another functional block diagram in the form of a computing system including an apparatus 501 including a host 502 and a memory device 504 in accordance with a number of embodiments of the present disclosure. The memory device 504 can include circuitry implemented on a field programmable gate array (FPGA). Components illustrated within the dashed box 540 can be circuitry implemented on a FPGA. However, embodiments of the present disclosure are not so limited.

The memory device 504 can include a processing device 554. In at least one embodiment, the processing device 554 can be a cache coherent reduced instruction set computing (RISC) device. A non-limiting example of a cache coherent reduced instruction set computing device is a 32-bit RISC-V device. The processing device 553 can be configured to receive commands from the host 502. The processing device 553 can be configured to provide a signal to the host 502 indicative of completion and/or execution of commands from the host 502. The processing device 553 can be configured to provide a signal to the host 502 indicative of an interrupt.

The memory device 504 can include logic circuitry 522. The logic circuitry 522 can be analogous to the logic circuitry 222 described in association with FIG. 2A. The logic circuitry 522 can be coupled to acceleration circuitry 520. However, embodiments of the present disclosure are not so limited. For example, the logic circuitry 522 can be a component of the acceleration circuitry 520 as illustrated by FIG. 2A. The acceleration circuitry 520 can be referred to as a posit arithmetic logic unit (PALU).

The acceleration circuitry 520 can include a plurality of buffers configured to receive data values from the logic circuitry 522. A buffer configured to receive data values from the logic circuitry 522 can be referred to as an "inbuffer" (e.g., the inbuffer 545). Each inbuffer can be configured to store an operand formatted in a unum or posit format. An operand can be represented by a bit string.

As illustrated by FIG. 5, inbuffer A 545 can be configured to store "operand A" and inbuffer B 546 can be configured to store "operand B." Operand A and/or operand B can be formatted in a unum or posit format. Although FIG. 5 illustrates two inbuffers 545 and 546, embodiments of the present disclosure are not so limited. For example, the acceleration circuitry 520 can include a single inbuffer or more than two inbuffers. In at least one embodiment, at least one inbuffer can be a first in, first out (FIFO) buffer.

The acceleration circuitry 520 can include circuitry (e.g., processing circuitry) configured to perform at least one arithmetic operation, at least one logical operation, or both, on at least one operand stored by at least one inbuffer. As illustrated by FIG. 5, the acceleration circuitry 520 can be configured to perform operations including, but not limited to addition, subtraction, multiplication, division, fused multiply addition, multiply-accumulate, dot product units, greater than or less than, absolute value (e.g., FABS( ), fast Fourier transforms, inverse fast Fourier transforms, sigmoid function, convolution, square root, exponent, as well as trigonometric operations such as sine, cosine, tangent, AND, OR, XOR, NOT, etc., and combinations thereof. In at least one embodiment, the acceleration circuitry 520 can include multiplication and accumulate (MAC) circuitry 548.

The acceleration circuitry 520 can include at least one buffer configured to receive data value resulting from performance of at least one arithmetic operation, at least one logical operation, or both by the acceleration circuitry 520. A buffer configured to transmit resulting data values can be referred to as an "outbuffer" (e.g., the outbuffer 547). An outbuffer can be configured to store a resulting data value formatted in a unum or posit format. Although FIG. 5 illustrates a single outbuffer 547, embodiments of the present disclosure are not so limited. For example, the acceleration circuitry 520 can more than one outbuffer. In at least one embodiment, at least one outbuffer can be a FIFO buffer.

The logic circuitry 522 can include a direct memory access (DMA) controller 542. The DMA controller 542 can be coupled to the inbuffers 545 and 546. The DMA controller 542 can be coupled to at least one memory resource. As illustrated by FIG. 5, the DMA controller 542 can be coupled to an interconnect 551, such as an advanced extensible interface (AXI) interconnect. The interconnect 551 can be coupled to a plurality of memory resources. At least one of the memory resources can be internal to the memory device 504, such as the scalable RAM 553 and the block RAM 555. As used herein, a "scalable RAM" refers to a dual port synchronous random-access memory unit deployed within an FPGA that can be coupled to multiple dual port synchronous random-access memory units to increase a quantity of storage locations available to the scalable RAM 553. The interconnect 551 can be coupled to a memory resource 530 that external to the memory device 504. The external memory resource 530 can be analogous to the memory array 130 and the memory array 230 described in association with FIGS. 1 and 2A-2B, respectively. The interconnect 551 can be coupled to the external memory resource 530 via a memory controller 550. The external memory resource 530 can be a main memory. A non-limiting example of the external memory resource 530 is double data rate (DDR) memory such as a DDR3 memory or DDR4 memory.

In at least one embodiment, the acceleration circuitry 520 can include a memory controller, such as the DMA controller 542. The memory controller can be coupled to memory including at least two distinct memory components. The memory controller can be configured to retrieve the first operand, the second operand, or both from a particular one of the at least two distinct memory components of the memory based, at least in part, on signaling received by the memory controller. For example, the DMA controller 542 can be configured to retrieve at least one operand from any of the memory resources coupled thereto, such as the scalable RAM 553, the block RAM 555, the external memory resource 530 (e.g., via the memory controller 550) and combinations thereof to the inbuffers 545 and 546. In addition, or alternatively, to retrieving an operand from the memory resources, the DMA controller 542 can be configured to retrieve an operand from the host 502.

The DMA controller 542 can be configured to communicate (e.g., transfer) a resulting data value from the outbuffer 547 to at least one operand from any of the memory resources coupled thereto, such as the scalable RAM 553, the block RAM 555, the external memory resource 530 (e.g., via the memory controller 550) and combinations thereof. In addition, or alternatively, to communicating a resulting data value to the memory resources, the DMA controller 542 can be configured to communicate a resulting data value to the host 502.

The memory device 504 can be configured to communicate with the host 502 via a Peripheral Component Interconnect Express (PCIe) interface 552.

In at least one embodiment, the logic circuitry 522 can include a microcoded controller 544. Instead of performing an arithmetic operation or a logical operation using the acceleration circuitry 520, the microcoded controller 544 can be used to identify a pre-computed result of the arithmetic operation or the logical operation. Results of a plurality of arithmetic operations, a plurality of logical operations, or both can be pre-computed using a plurality of operands formatted in a unum or posit format. The pre-computed results can be compiled into a look-up table (LUT). The LUT can be stored by the microcoded controller 544 or other circuitry of the logic circuitry 522. The microcoded controller 544 can receive, from a processing device such as the processing device 554 or a CPU of the host 502, instructions to perform a particular operation of the plurality of arithmetic operations or the plurality of logical operations using a particular set of the plurality of operands. The microcoded controller 544 can identify, via the LUT, one of the pre-computed results corresponding to the particular operation and the particular set of the plurality of operands. An additional arithmetic or logical operation can be performed using the identified result.

The memory device 504 can include multiple instances of the logic circuitry 522 and the acceleration circuitry 520 as represented by the overlapped representation the logic circuitry 522 and the acceleration circuitry 520. However, the overlapped representation is not intended to a physical orientation and/or overlapping of multiple instances of the logic circuitry 522 and the acceleration circuitry 520.

Figure 6:
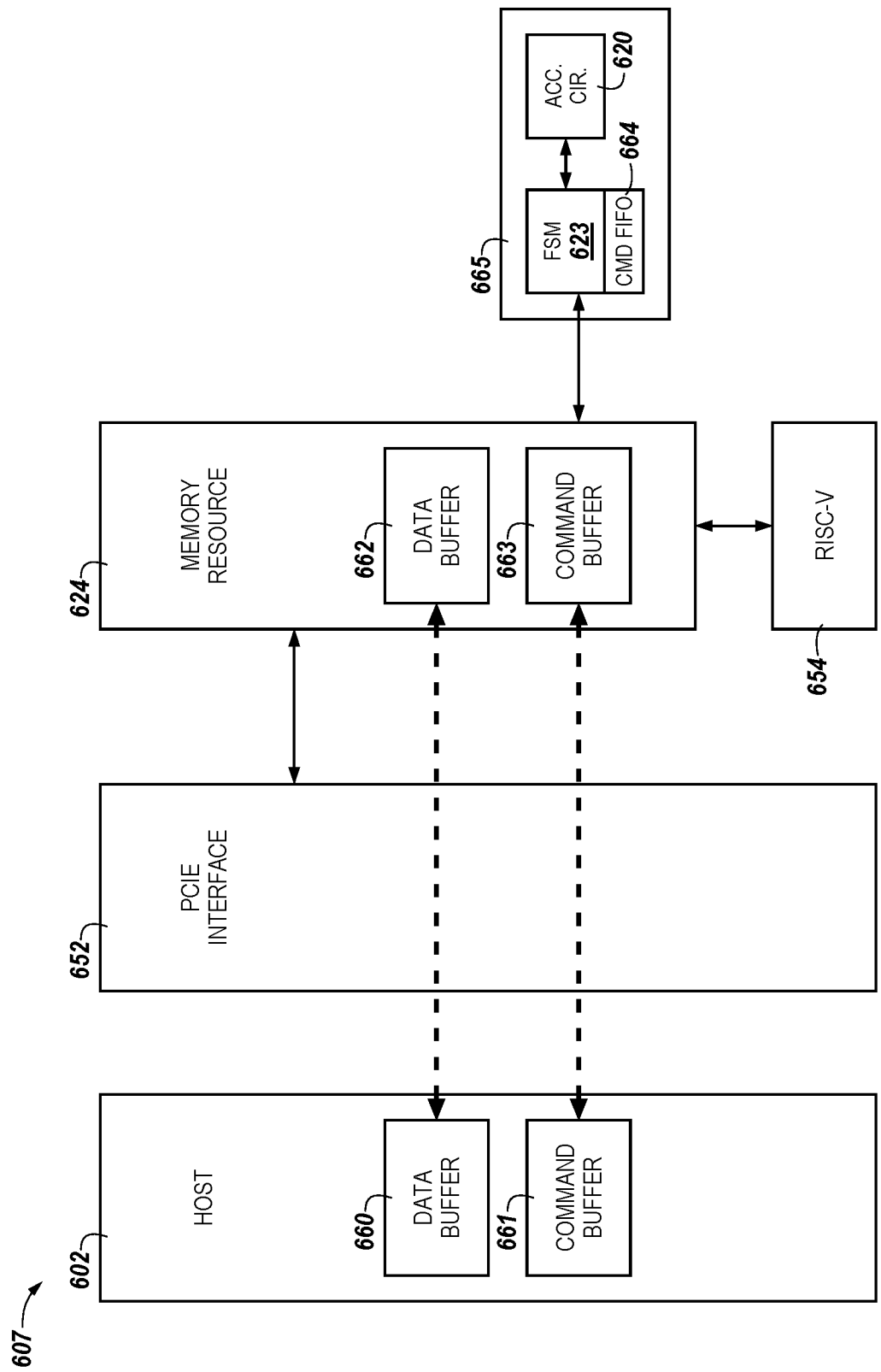
FIG. 6 is another functional block diagram in the form of a computing system including an apparatus including a host and a memory resource in accordance with a number of embodiments of the present disclosure.

FIG. 6 is another functional block diagram in the form of a computing system including an apparatus 607 including a host 602 and a memory resource 624 in accordance with a number of embodiments of the present disclosure. The memory resource 624 can be analogous to the scalable RAM 553, the block RAM 555, and/or the DDR3 memory 530 described in associated with FIG. 5. The memory resource 624 can be configured to communicate with the host 602 via a PCIe interface 652.

A first buffer of a host 602, such as the data buffer 660, can be configured to store data values (e.g., data vectors). Data values stored by the data buffer 660 of the host 602 can be communicated (e.g., transferred) to a second buffer, such as the data buffer 662 of the memory resource 624. Data values stored by the data buffer 662 of the memory resource 624 can be communicated to the data buffer 660 of the host 602. A third buffer, a command buffer 661, can be maintained by the host 602. The command buffer 661 can be configured to store commands communicated from a CPU of the host 602. Commands stored by the command buffer 661 of the host 602 can be copied (mirrored) to a fourth buffer, a command buffer 663 of the memory resource 624. Commands stored by the command buffer 663 of the memory resource 624 can be copied to the command buffer 661 of the host 602.

A processing device 654, illustrated as a RISC-V device by FIG. 6, can be configured to monitor the command buffer 623 of the memory resource 624. The processing device 654 can be configured to parse instructions stored by the command buffer 663 of the memory resource 624 into signals indicative of performance of an arithmetic operation, a logical operation, or both, to be performed by computation circuitry 665. The computation circuitry 665 can include processing circuitry configured to perform an arithmetic operation, a logical operation, or both. For example, in response to a command being mirrored from the command buffer 661 of the host 602 to the command buffer 663 of the memory resource 624, the processing device 654 can be configured to parse that mirrored command (e.g., a host-level command) into one or more machine-level instructions (e.g., finite state machine commands). The processing device 654 can be configured to, in response to a state machine, such as the state machine 623, executing the machine-level instructions parsed from a host-level command, communicate data indicative of completion of that host-level command to the command buffer 663 of the memory resource 624. The data indicative of completion of the host-level command can be copied from the command buffer 663 of the memory resource 624 to the command buffer of the host 602.

The computation circuitry 665 can be configured to receive signals from the processing device 654, retrieve particular ones of the operands stored by the data buffer 662 of the memory resource 624, at least in part, on the received signals, and perform an arithmetic operation, a logical operation, or both, using the retrieved operands based, at least in part, on the received signals. The processing device 654 can be configured to communicate machine-level instructions to a buffer 664 of computation circuitry 665. The buffer 664 can be a FIFO buffer. The buffer 664 can enable multiple machine-level instructions to be stored by the buffer 664 without waiting for completion of each individual machine-level instruction.

The computation circuitry 665 can include a state machine 623 (e.g., a finite state machine (FSM)). The state machine 623 can be analogous to the state machine 223 described in association with FIG. 2B. The state machine 623 can retrieve machine-level instructions from the buffer 664. The state machine 623 can be configured to direct performance of the arithmetic operation, the logical operation, or both according to the machine-level instructions.

The computation circuitry 665 can include acceleration circuitry 620 coupled to the state machine 623. The acceleration circuitry 620 can be analogous to the acceleration circuitry 520 described in association with FIG. 5.

A non-limiting example of a host-level command is a general matrix multiply (GEMM) command. Implementation of a GEMM command can include the host 602 transferring bit strings representing matrices from the data buffer 660 to the data buffer 662 of the memory resource 624. Implementation of the GEMM command can include communicating command data associated with the GEMM command (e.g., addresses and sizes of the two matrices) to the command buffer 661 of the host 602. The command data can be copied from the command buffer 661 of the host 602 to the command buffer 663 of the memory resource 624. The processing device 654 can detect the command data stored by the command buffer 663 of the memory resource 624 and parse the GEMM command into machine-level instructions, such as a plurality of dot product operations. The processing device 654 can be parse each dot product operation into a plurality of FSM commands. The FSM commands can include, but are not limited to, clear QUIRE, perform dot product, transfer result to a buffer of the acceleration circuitry 620 (e.g., the outbuffer 547 described in association with FIG. 5), and write result from the buffer to a result location. In response to completion of all the FSM commands for all the dot product operations, the processing device 654 can communicate data indicative of completion of the GEMM command to the command buffer 663 of the memory resource 624. The data indicative of completion of the GEMM command can be copied from the command buffer 663 of the memory resource 624 to the command buffer 661 of the host 602.

The PCIe interface 652, the memory resource 624, the processing device 654, and/or the computation circuitry 665 can be implemented on a FPGA.

Figure 7:
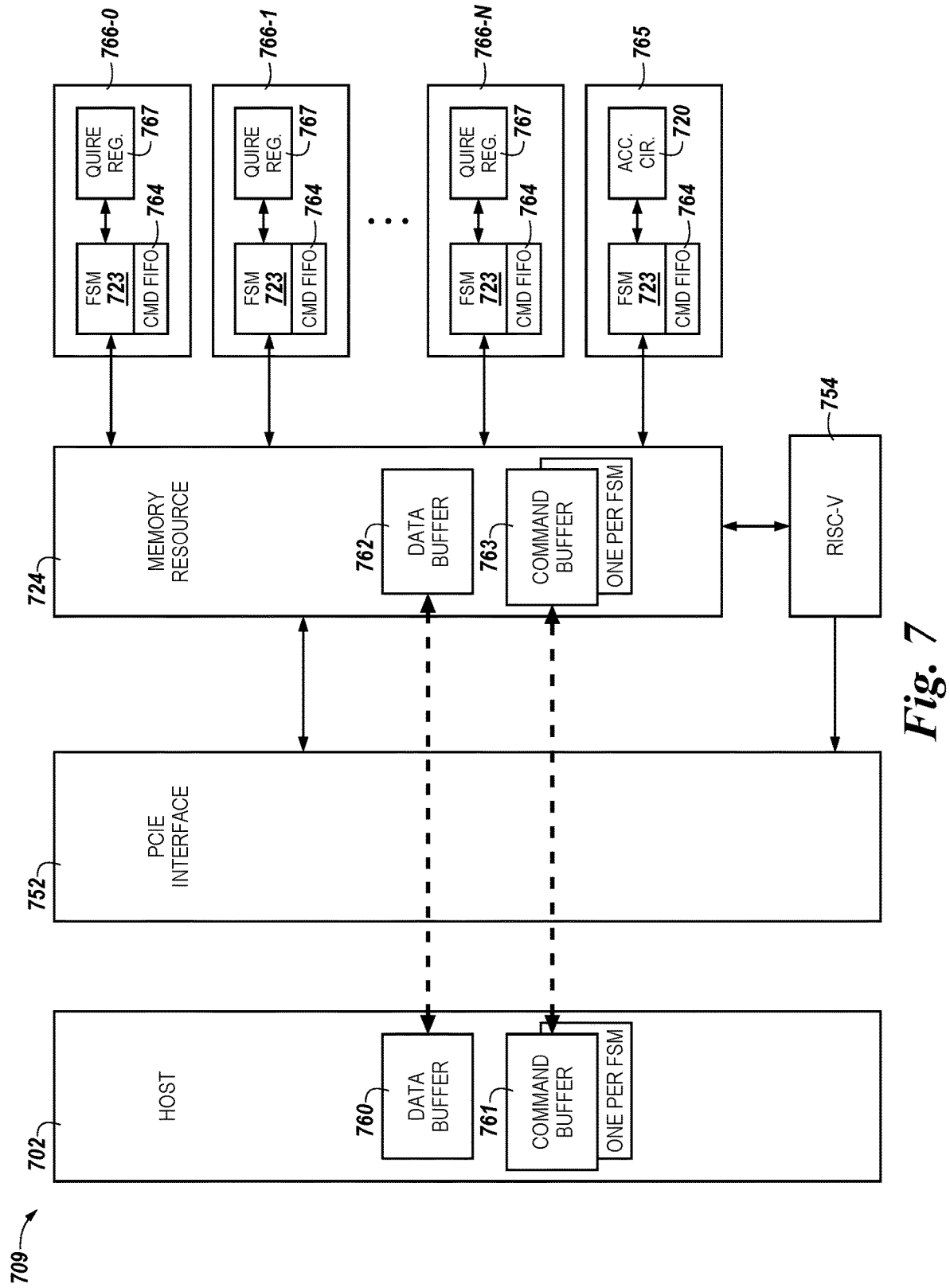
FIG. 7 is another functional block diagram in the form of a computing system including an apparatus including a host and a memory resource in accordance with a number of embodiments of the present disclosure.

FIG. 7 is another functional block diagram in the form of a computing system including an apparatus 709 including a host 702 and a memory resource 724 in accordance with a number of embodiments of the present disclosure. The host 702, the PCIe interface 752, the memory resource 724, the processing device 754, and the computation circuitry 765 can be analogous to the host 602, the PCIe interface 652, the memory resource 624, the processing device 654, and the computation circuitry 665 described in association with FIG. 6.

In comparison to the apparatus 607 illustrated by FIG. 6, the apparatus 709 includes a plurality of computation circuits 766-0, 766-1, ... 766-N (collectively referred to as the computation circuits 766). Similar to the computation circuitry 765, each of the computation circuits 766 can include a buffer 764 and a state machine 723 (e.g., an FSM). The buffer 766 can be configured to store machine-level instructions (e.g., FSM commands). However, each of the computation circuits 766 includes a quire register 767 coupled to the state machine 723. The quire register 767 can be configured to store results (e.g., intermediate results) of iterations of a recursive operation, such as an arithmetic operation or a logical operation, performed by a MAC. In some embodiments, each of the computation circuits 766 can include a sense amplifier stripe, a bunch of flip-flops, or both in addition to, or alternatively to, the state machine 723.

As illustrated by FIG. 7, the command buffer 761 of the host 702 and the command buffer 763 of the memory resource 724 each include storage (e.g., a command buffer) associated with each state machine of the computation circuits 766 and the computation circuitry 765. The command buffers 761 and 763 includes storage for each of the state machines of the N+1 computation circuits 766 and the state machine 723 of the computation circuitry 765.

As described in association with FIG. 6, the processing device 754 can parse host-level commands associated with matrix multiplication (e.g., a GEMM command) into a plurality of machine-level instructions associated with dot product operations. The dot products operations can be performed in parallel using the computation circuits 766. Machine-level instructions for respective dot product operations can be distributed amongst the computation circuits 766. The PCIe interface 752, the memory resource 724, the processing device 754, the computation circuitry 765 and/or the computation circuits 766 can be implemented on a FPGA. Including the quire register 767 in each of the computation circuits 766 instead of the acceleration circuitry 720 of the computation circuitry 765 can reduce the amount of resources of a FPGA to implement the computation circuits 765. In contrast to the apparatus 709, the acceleration circuitry 520 of the apparatus 501 illustrated by FIG. 5 implementation of the acceleration circuitry 520 can utilize a greater amount of resources of a FPGA. Including the quire register 767 in each of the computation circuits 766 can increase the quantity of arithmetic and/or logical operations that can be performed in parallel while reducing the amount of resources of a FPGA to implement.

Figure 8:
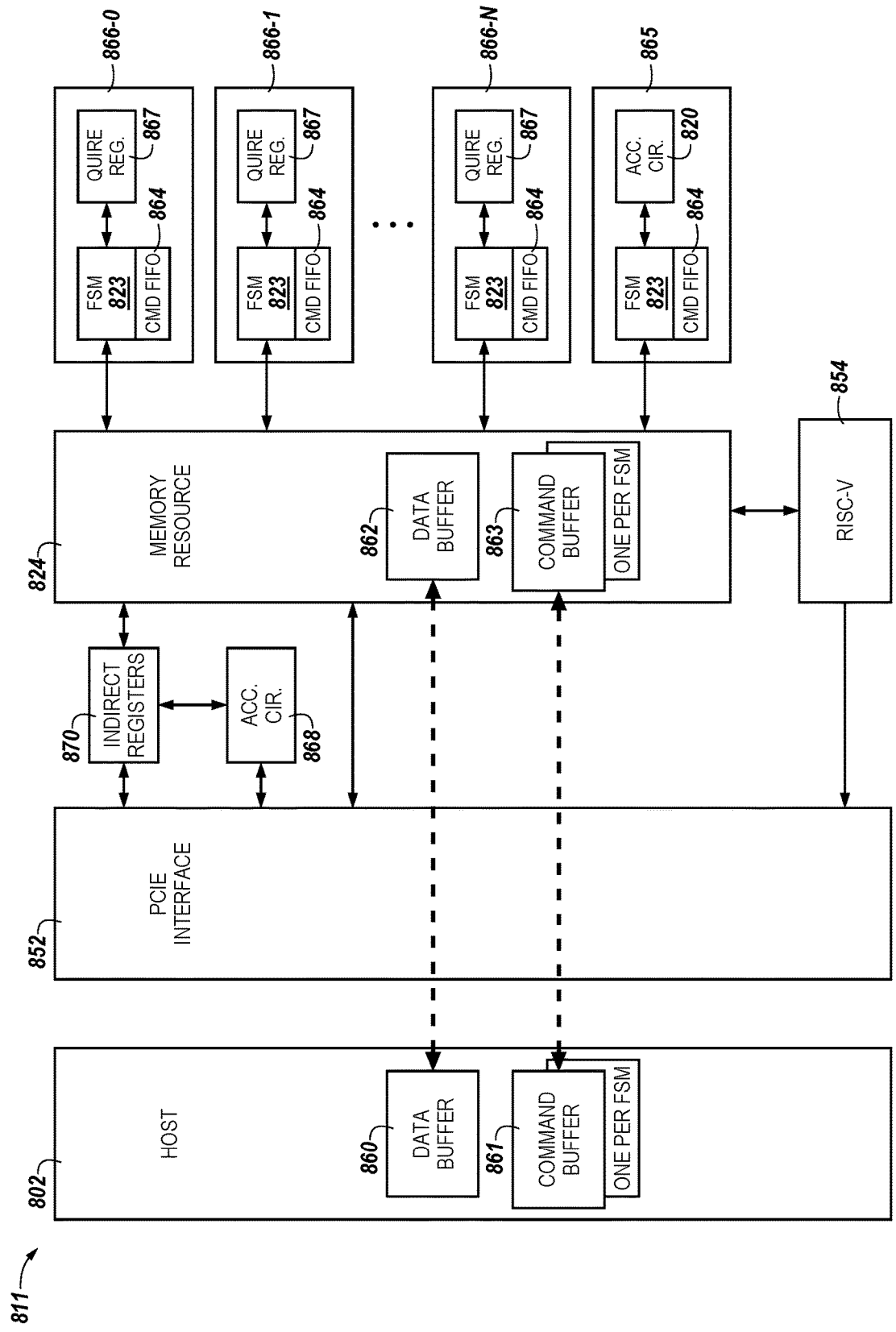
FIG. 8 is another functional block diagram in the form of a computing system including an apparatus including a host and a memory resource in accordance with a number of embodiments of the present disclosure.

FIG. 8 is another functional block diagram in the form of a computing system including an apparatus 811 including a host 802 and a memory resource 824 in accordance with a number of embodiments of the present disclosure. The host 802, the PCIe interface 852, the memory resource 824, the processing device 854, the computation circuitry 865, and the computation circuits 866 can be analogous to the host 702, the PCIe interface 752, the memory resource 724, the processing device 754, the computation circuitry 765, and the computation circuits 766 described in association with FIG. 7.

In comparison to the apparatus 709 illustrated by FIG. 7, the apparatus 811 includes acceleration circuitry 868 coupled to the PCIe interface 852 in addition to the acceleration circuitry 820 of the computation circuitry 865. The acceleration circuitry 868 can have the same structure as or a different structure than the acceleration circuitry 820 of the computation circuitry 865. The acceleration circuitry 868 can be coupled directly to the PCIe interface 852. The acceleration circuitry can be mapped into a memory space associated with the PCIe interface 852, such as indirect registers 870. The indirect registers 870 can be configured to store scalar operands, a result of an arithmetic or logical operation, or both. An outbuffer, (e.g., the outbuffer 547 described in association with FIG. 5) of the acceleration circuitry 868 can be combined with busy flags such that a read operation from the outbuffer would not be completed until the acceleration circuitry 868 has completed performance of an arithmetic or logic operation. A scalar multiplication operation, performed using the apparatus 800 and the acceleration circuitry 868, can include writing a first scalar operand (operand A) to a first inbuffer of the acceleration circuitry 868 (e.g. the inbuffer 545), writing a second scalar operand (operand B) to a second inbuffer of the acceleration circuitry 868 (e.g., the inbuffer 546), and reading a result of a multiplication operation of the first and second scalar operands from a multiply result register. Using the acceleration circuitry 868 to perform scalar operations can be more efficient than using the acceleration circuitry 820 of the computation circuitry 865.

In at least one embodiment, the apparatus 800 can provide indirect access to operands stored by the memory resource 824. For example, if a combination of scalar operations and vector operations is to be performed, then it can be more efficient to load vector data into the memory resource 824 and maintain storage of the vector data by the memory resource 824 such that the state machines 823 of the computation circuits 866 and the computation circuitry 865 can access the vector data without having to communicate data to and from the host 802. If a scalar operation is to be performed on the vector data or results from the vector operations, then the scalar operations against the memory resource 824. An indirect scalar multiplication operation can include writing an address of a first operand (operand A) stored in the memory resource 824 to the indirect registers 870, writing an address of a second operand (operand B) stored in the memory resource 824 to the indirect registers 870, and writing an address of a result of a scalar operation using the first and second operands stored in the memory resource 824 to the indirect registers 870.

Figure 9:
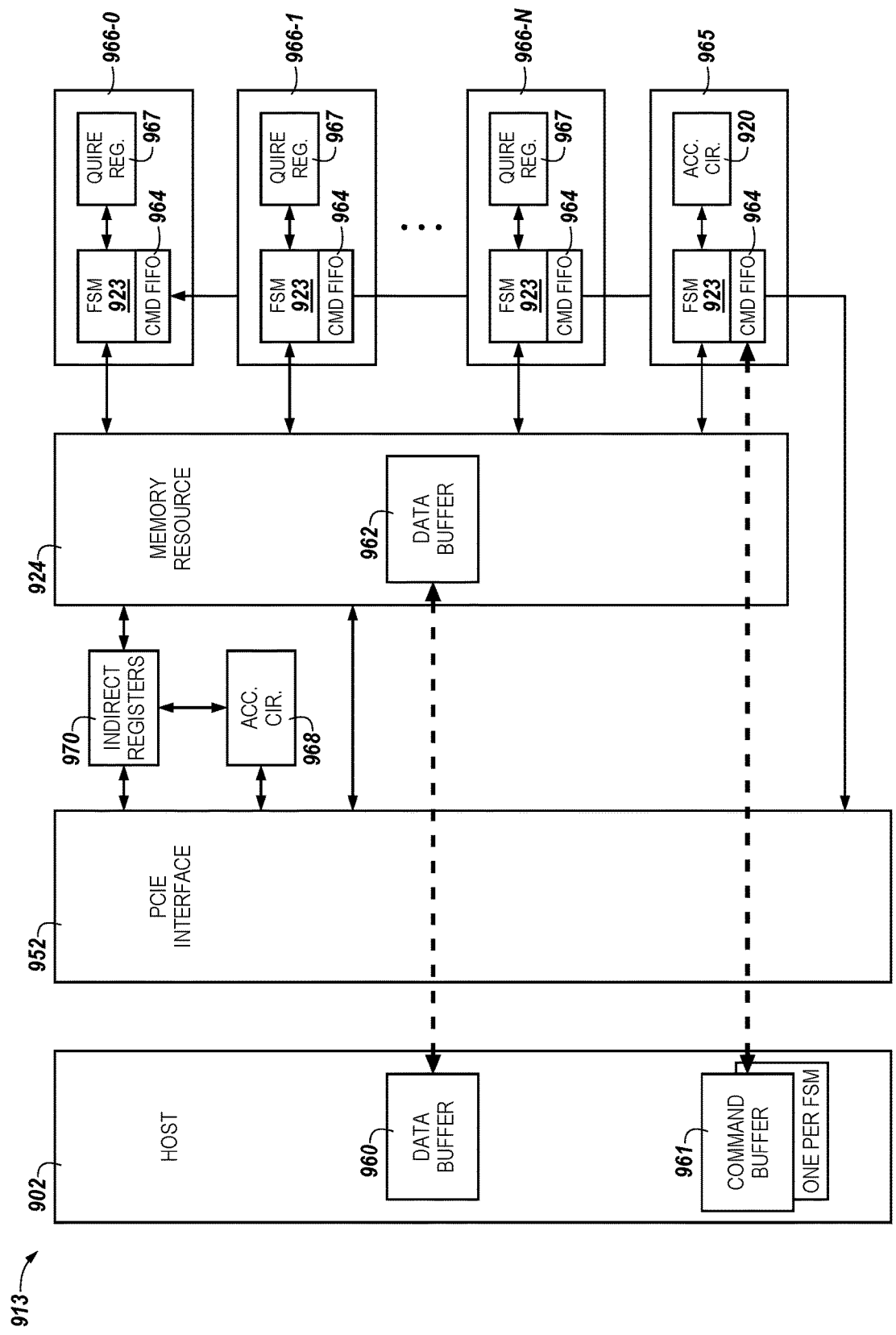
FIG. 9 is another functional block diagram in the form of a computing system including an apparatus including a host and a memory resource in accordance with a number of embodiments of the present disclosure.

FIG. 9 is another functional block diagram in the form of a computing system including an apparatus 913 including a host 902 and a memory resource 924 in accordance with a number of embodiments of the present disclosure. The host 902, the PCIe interface 952, the memory resource 924, the computation circuitry 965, and the computation circuits 966 can be analogous to the host 802, the PCIe interface 852, the memory resource 824, the computation circuitry 865 and the computation circuits 866 described in association with FIG. 8.

In comparison to the apparatus 811 illustrated by FIG. 8, the apparatus 913 does not include a processing device coupled to the PCIe interface 952 and the memory resource 924. The buffer 964 of the computation circuitry 965 can be mapped to a memory space of the PCIe interface 952. Mapping the buffer 964 to a memory space of the PCIe interface 952 can enable a software driver of the host 902 provide functionality that is provided by embedded software of the processing device (e.g., the processing device 854 described in association with FIG. 8). The software driver of the host 902 can operate at a higher throughput than the embedded software of the processing device.

In at least one embodiment, the host 902 (e.g., via a CPU of the host 902) can parse higher-level commands (e.g., host-level commands), such as a GEMM command, into lower-level commands (e.g., machine-level instructions), such as state machine commands associated with dot product operations of the GEMM command. Lower-level commands can be stored by the command buffer 961 of the host 902, which includes storage (e.g., a register) corresponding to each state machine 923 of the computation circuits 966 and the computation circuitry 965. Respective lower-level commands can be communicated (e.g., transferred) from respective storage of the command buffer 961 corresponding to a state machine of one of the computation circuits 966-0, 966-1, . . . , 966-N or the computation circuitry 965 to the command buffer 964 of that one of the computation circuits 966 or the computation circuitry 965. For example, machine-level instructions can be transferred from a register of the command buffer 961 corresponding to the state machine 923 of the computation circuit 966-1 to the command buffer 964 of the computation circuit 966-1.

Figure 10:
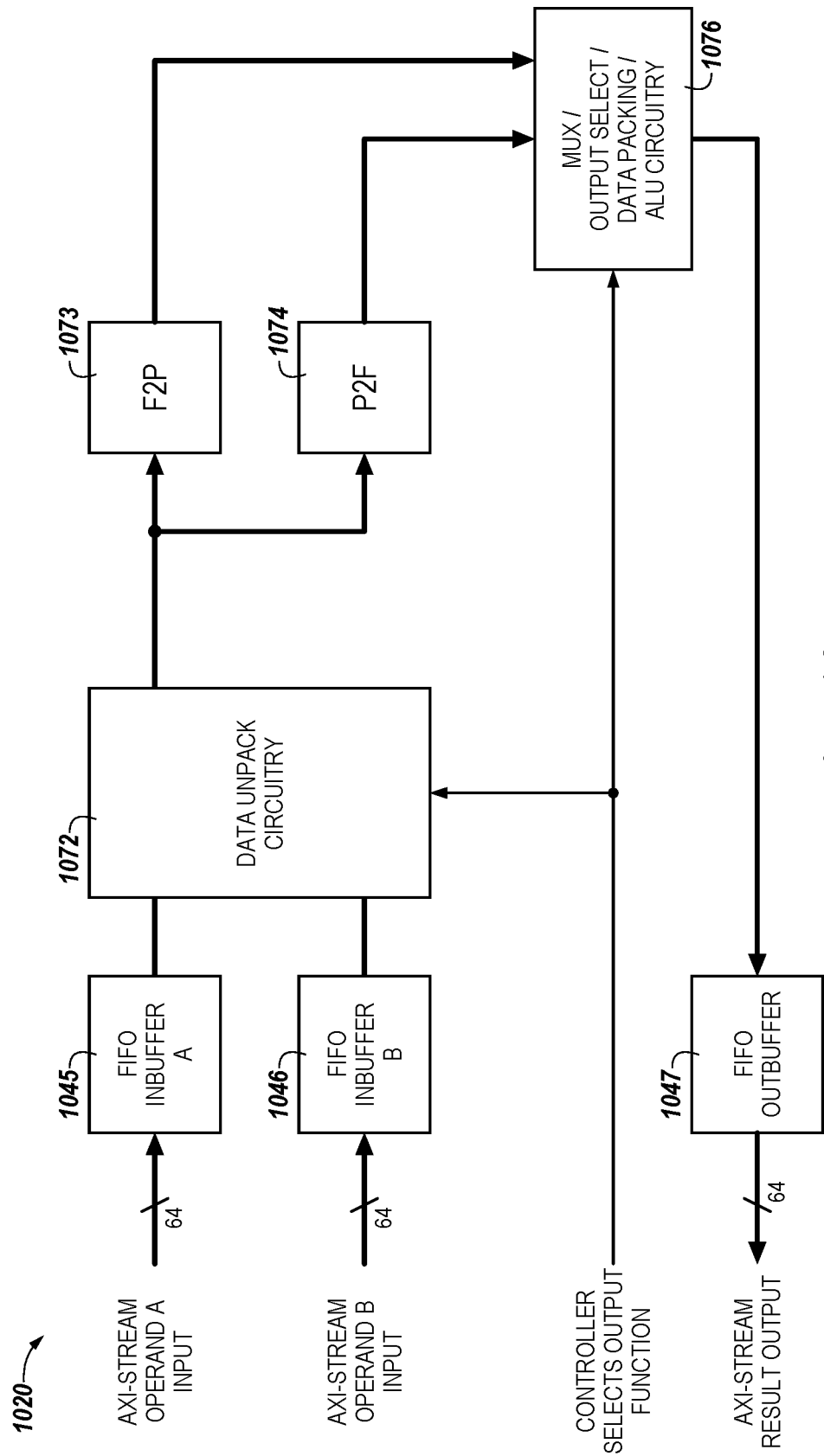
FIG. 10 is a functional block diagram in the form of acceleration circuitry in accordance with a number of embodiments of the present disclosure.

FIG. 10 is a functional block diagram in the form of acceleration circuitry 1020 in accordance with a number of embodiments of the present disclosure. The acceleration circuitry 1020 can be analogous to any of the acceleration circuitries 520, 620, 720, 820, 868, 920, and 968 described in association with FIGS. 5-9. The acceleration circuitry 1020 can be implemented on a FPGA.

The acceleration circuitry 1020 can be capable of storing bursts of incoming data because an arithmetic operation can be performed using two or more operands. Data values corresponding to both operands can be supplied to the acceleration circuitry 1020 during a same clock cycle. For example, if two operands are being retrieved from an external memory resource (e.g., the DDR3 memory 530 described in association with FIG. 5) in 256-byte bursts, then there is no guarantee that the data values will arrive at the correct time. In at least one embodiment, the acceleration circuitry 1020 can include AXI-stream FIFOs, such as the inbuffers 1046 and 1046. The acceleration circuitry 1020 can include an outbuffer 1047, which can be configured to buffer data values representing results from the arithmetic blocks before communicating the data values from the acceleration circuitry 1020 to, for example, the DDR3 memory 530.

In at least one embodiment, the acceleration circuitry 1020 can read sixty-four bits of data from the inbuffers 1046 and 1046 and convert the data into a format compatible with circuitry configured to perform an arithmetic operation. For example, in an 8-bit posit environment, operands read from the inbuffer 1045, the inbuffer 1046, or both can be converted, by circuitry 1072 into eight sequential inputs on a bus. The circuitry 1076 can include a multiplexer configured to select an output. The circuitry 1076 can include an ALU. The ALU can include circuitry (e.g., hardware, logic, one or more processing devices, etc.) to perform operations (e.g., arithmetic operations, logical operations, bitwise operations, etc.) on integer binary bit strings, such as bit strings in the posit format. Results from operations performed by the circuitry 1076, corresponding to the eight sequential inputs, can be packed into a 64-bit word, for example, by circuitry 1076 before writing the 64-bit word to the outbuffer 1047.

In at least one embodiment, the inbuffer 1045, the inbuffer 1046, the outbuffer 1047, the circuitry 1072, and/or the circuitry 1076 can be implemented in DMA blocks.

In at least one embodiment, the acceleration circuitry 1020 can include circuitry 1073 configured to convert a data value formatted in a floating point format to a unum or posit format. The acceleration circuitry 1020 can include circuitry 1074 configured to convert a data value formatted in a unum or posit format to a floating point format.

Figure 11:
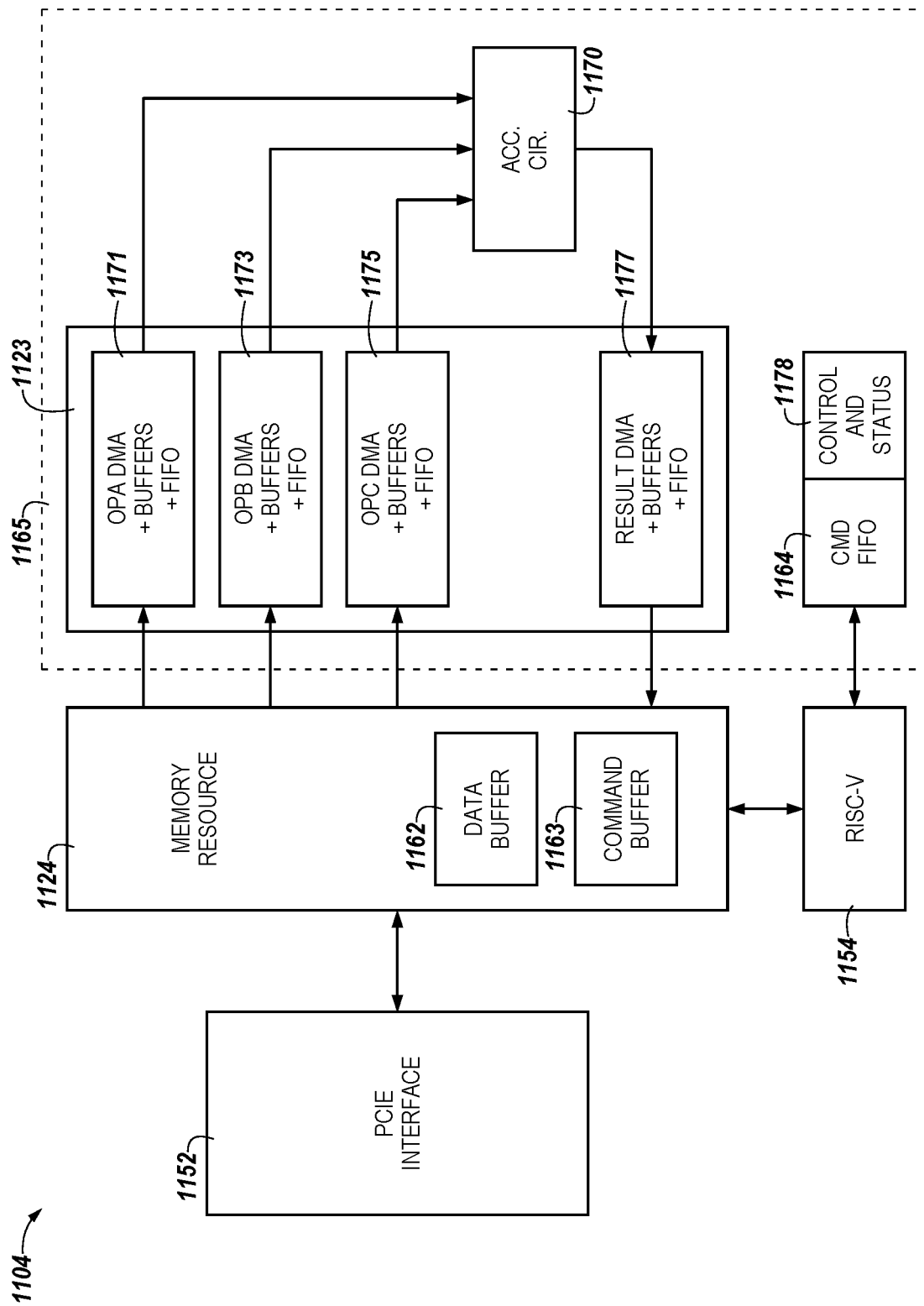
FIG. 11 is another functional block diagram in the form of a memory device in accordance with a number of embodiments of the present disclosure.

FIG. 11 is another functional block diagram in the form of a memory device 1104 in accordance with a number of embodiments of the present disclosure. The PCIe interface 1152, the memory resource 1124, and the computation circuitry 1165 can be analogous to the PCIe interface 652, the memory resource 624, and the computation circuitry 865 described in association with FIG. 6. FIG. 11 illustrates components of the state machine 1123 of the computation circuitry 1165.

The state machine 1123 can include a plurality of DMA controllers. Each respective DMA controller can be coupled to a respective buffer. Each buffer can be a FIFO buffer. As illustrated by FIG. 11, the state machine 1123 can include a first set 1171 of a DMA controller and a FIFO buffer configured to retrieve (e.g., from the memory resource 1124) and store a first operand (operand A (OPA)). The state machine 1123 can include a second set 1173 of a DMA controller and a FIFO buffer configured to retrieve (e.g., from the memory resource 1124) and store a second operand (operand B (OPB)). The state machine 1123 can include a third set 1175 of a DMA controller and a FIFO buffer configured to retrieve (e.g., from the memory resource 1124) and store a third operand (operand C (OPC)). The FIFO buffers of the sets 1171, 1173, and 1175 between the output of the respective DMA controllers and the acceleration circuitry 1120 can enable a speed at which the acceleration circuitry 1120 performs operations to be increased.

The acceleration circuitry 1120 of the computation circuitry 1165 can retrieve the first operand, the second operand, the third operand, or combinations thereof from the respective FIFO buffers of the state machine 1123. Although FIG. 11 illustrates three sets 1171, 1173, and 1175 of the DMA controller and FIFO buffer for retrieval and storage of operands, embodiments are not so limited. For example, the state machine 1123 can include fewer than three sets of a DMA controller and FIFO buffer or greater than three sets of a DMA controller and FIFO buffer.

The state machine 1123 can include a set 1177 of a DMA controller and a buffer configured to retrieve, store, and communicate a result from the acceleration circuitry 1120. The buffer of the set 1177 can be a FIFO buffer.

The processing device 1158 can communicate commands such as a count, addresses, sizes, strides, and operations to be performed by the acceleration circuitry 1120, to the command buffer 1164. As illustrated by FIG. 11, the computation circuitry 1165 can include memory 1178 configured to store data indicative of control signals, status, or both. The DMA controllers of the sets 1171, 1173, and 1175 can retrieve respective operands based, at least in part, on commands, from the processing device 1158, including a start address, a amount of data to be retrieved (e.g., the start address+N*stride*operand size) a count of operations. As used herein, "stride" refers to an address increment between samples that are processed. For example, a stride of −1 can be used to read data from a buffer in reverse order. As another example, a stride of 2 can be used to read data from a buffer at address offsets of 0, 2, 4, 6, 8, etc.

Figure 12:
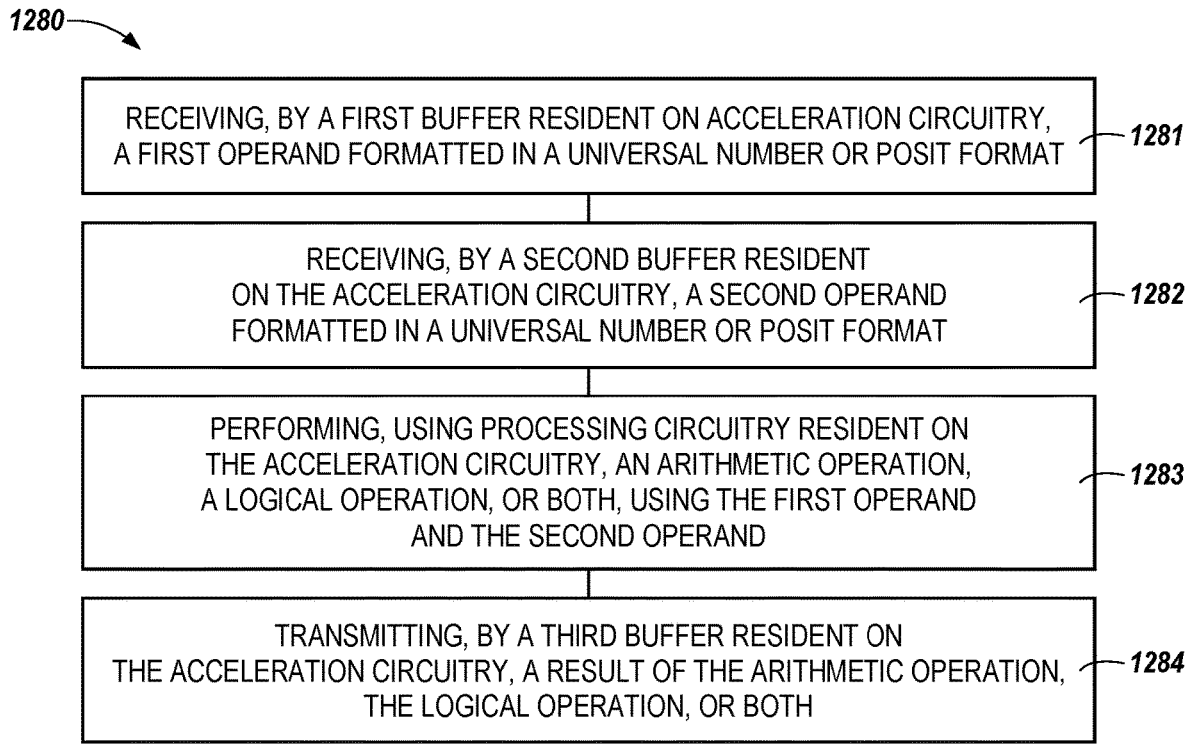
FIG. 12 is a flow diagram representing an example method for acceleration circuitry for posit operations in accordance with a number of embodiments of the present disclosure.

FIG. 12 is a flow diagram representing an example method 1280 for acceleration circuitry for posit operations in accordance with a number of embodiments of the present disclosure. At block 1281, the method 1280 can include receiving a first operand by a first buffer resident on acceleration circuitry. The first operand can be formatted in a unum or posit format. The first buffer can be a FIFO buffer. The acceleration circuitry can be analogous to the acceleration circuitry 120, 220, 520, 620, 720, 820, 868, 920, 968, 1020, and 1120 described in association with FIGS. 1, 2, and 5-11, respectively.

At block 1282, the method 1280 can include receiving a second operand by a second buffer resident on the acceleration circuitry. The second operand can be formatted in a unum or posit format. The second buffer can be a FIFO buffer.

At block 1283, the method 1280 can include performing an arithmetic operation, a logical operation, or both, using the first operand and the second operand. The arithmetic operation can, as described above, include arithmetic operations such as addition, subtraction, multiplication, division, fused multiply addition, multiply-accumulate, dot product units, greater than or less than, absolute value (e.g., FABS( ), fast Fourier transforms, inverse fast Fourier transforms, sigmoid function, convolution, square root, exponent, and/or rectified linear unit (ReLu), as well as trigonometric operations such as sine, cosine, tangent, etc., while the logical operation can include logical operations such as AND, OR, XOR, NOT, etc.

At block 1284, the method 1280 can include transmitting, a result of the arithmetic operation, the logical operation, or both by a third buffer resident on the acceleration circuitry. The result can be formatted in a unum or posit format. The third buffer can be a FIFO buffer.

In some embodiments, the acceleration circuitry can be implemented on a FPGA. The method 1280 can further include retrieving the first operand, the second operand, or both, from a memory resident on the FPGA. The method 1280 can further include retrieving the first operand, the second operand, or both from a main memory external to the acceleration circuitry. The method 1280 can further include retrieving the first operand, the second operand, or both via a DMA controller couplable to the acceleration circuitry. The method 1280 can further include transferring the first operand, the second operand, or both from a host couplable to the acceleration circuitry to at least one of a memory implemented on the FPGA and a main memory couplable to the acceleration circuitry.

Figure 13:
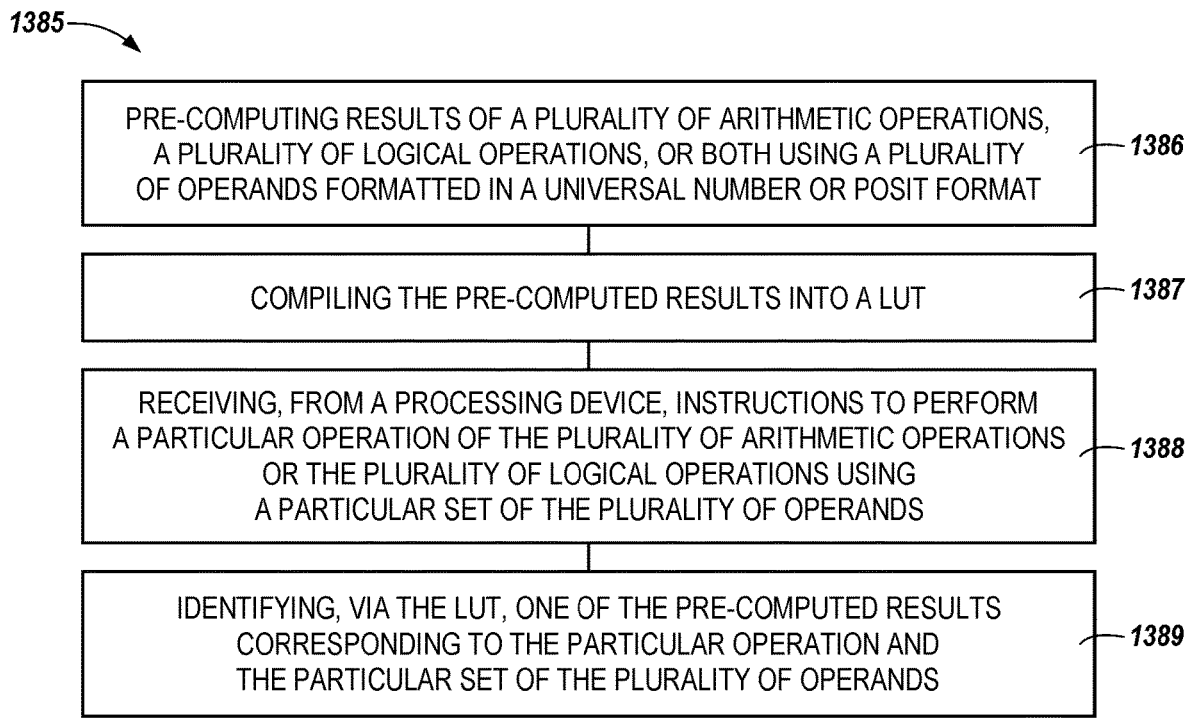
FIG. 13 is another flow diagram representing an example method for acceleration circuitry for posit operations in accordance with a number of embodiments of the present disclosure.

FIG. 13 is another flow diagram representing an example method 1385 for acceleration circuitry for posit operations in accordance with a number of embodiments of the present disclosure. In at least one embodiment, the method 1385 can be implemented, at least in part, by the microcoded controller 544 described in association with FIG. 5. At block 1386, the method 1385 can include pre-computing results of a plurality of arithmetic operations, a plurality of logical operations, or both using a plurality of operands formatted in a unum or posit format. In some embodiments, pre-computing the results can include pre-computing results of the plurality of arithmetic operations, the plurality of logical operations, or both using a particular bit length of operands.

At block 1387, the method 1385 can include compiling the pre-computed results into a LUT. As described herein, the LUT can be used to identify a result of a particular arithmetic or logical operation within the LUT rather than performing the particular arithmetic or logical operation. For example, in response to instructions to perform a particular arithmetic or logical operation, a microcoded controller (e.g., the microcoded controller 544) can identify a result of the particular arithmetic or logical operation, instead of performing the particular arithmetic or logical operation.

At block 1388, the method 1385 can include receiving, from a processing device, instructions to perform a particular operation of the plurality of arithmetic operations or the plurality of logical operations using a particular set of the plurality of operands. In some embodiments, receiving the instructions from the processing device can include receiving the instructions from a host processing device.

At block 1389, the method 1385 can include identifying, via the LUT, one of the pre-computed results corresponding to the particular operation and the particular set of the plurality of operands. In some embodiments, identifying the one of the pre-computed results can include determining an address of the LUT associated with a result of the particular operation and the particular set of the plurality of operands. In some embodiments, the method 1385 can further include performing an additional arithmetic or logical operation using the identified result.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving, by a data buffer on a memory device, a first operand and a second operand formatted in a posit format;
receiving, by a command buffer on the memory device, instructions from a host;
parsing, by a processing device, the instructions stored by the command buffer into signals indicative of performance of an arithmetic operation or a logical operation;
performing, by a computation circuitry, the arithmetic operation or the logical operation, wherein the performing by the computation circuitry further comprise:

receiving, by a buffer, machine-level instructions from the processing device;

directing, by a state machine, a multiplication and accumulate (MAC) circuitry of an acceleration circuitry to perform the arithmetic operation or the logical operation using the first operand and the second operand and according to the machine-level instruction;

communicating, by the processing device to the command buffer of the memory device, a data that is indicative of the completion of the machine-level instructions; and copying the data from the command buffer of the memory device to a command buffer of the host.

2. The method of claim 1, further comprising:
determining whether the machine-level instructions have been executed by the state machine; and
responsive to determining that the machine-level instructions have been executed, causing the command buffer to store the data indicative of the machine-level instructions being executed.

3. The method of claim 1, further comprising retrieving the first operand, the second operand, or both from an external memory resource.

4. The method of claim 3, further comprising retrieving the first operand, the second operand, or both via a direct memory access (DMA) controller of the memory device.

5. The method of claim 4, wherein the acceleration circuitry is implemented on a field programmable gate array (FPGA) of the memory device.

6. An apparatus, comprising:
a host; and
a memory device coupled to the host and comprising:
a data buffer configured to store a first operand and a second operand formatted in a posit format;
a command buffer configured to store instructions received from the host;
a processing device coupled to the data buffer and the command buffer, wherein the processing device is configured to parse instructions stored by the command buffer into signals indicative of performance of an arithmetic and logical operations;
a computation circuitry configured to perform the arithmetic operation and the logical operation, wherein the computation circuitry further comprises:
a buffer configured to store machine-level instructions;
an acceleration circuitry that includes a multiplication and accumulate (MAC) circuitry; and
a state machine coupled to the buffer and the acceleration circuitry, the state machine is configured to direct performance of the arithmetic operation or the logical operation, by the MAC, using the first operand and the second operand and according to the machine-level instructions,
wherein in response to the state machine executing the machine-level instructions, the processing device communicates to the command buffer a data that is indicative of the completion of the machine-level instructions.

7. The apparatus of claim 6, wherein the data buffer and the command buffer each comprise a first in, first out (FIFO) buffer.

8. The apparatus of claim 6, wherein the host is configured to mirror instructions stored in a command buffer of the host to the command buffer of the memory device.

9. The apparatus of claim 8, wherein the data that is indicative of the completion of the machine-level instructions is copied to the command buffer of the host.

10. The apparatus of claim 6, wherein the apparatus is implemented on a field programmable gate array (FPGA) of the memory device.

11. The apparatus of claim 6, wherein the processing device is configured to:
parse host-level instructions into machine-level instructions; and
communicate the machine-level instructions to the command buffer of the memory device.

12. The apparatus of claim 11, wherein the processing device comprises a cache coherent reduced instruction set computing device.

13. The apparatus of claim 11, wherein the apparatus is configured to communicate with an external host via a Peripheral Component Interconnect Express (PCIe) interface.

14. A system, comprising:
a host; and
a memory device coupled to the host and comprising:
a data buffer configured to store operands formatted in a posit format and received from the host;
a command buffer configured to store instructions received from the host; and
a processing device coupled to the data buffer and the command buffer, wherein the process device is configured to parse instructions stored by the command buffer into signals indicative of performance of an arithmetic operation or a logical operation;
a computation circuitry configured to perform the arithmetic operation or the logical operation, wherein the computation circuitry further comprises:
a buffer configured to store machine-level instructions;
an acceleration circuitry that includes a multiplication and accumulate (MAC) circuitry; and
a state machine coupled to the buffer and the acceleration circuitry, the state machine is configured to direct performance of the arithmetic operation or the logical operation, by the MAC, using the stored operands and according to the machine-level instructions,
wherein in response to the state machine executing the machine-level instructions, the processing device communicates to the command buffer a data that is indicative of the completion of the machine-level instructions.

15. The system of claim 14, wherein the host is configured to mirror instructions stored in a command buffer of the host to the command buffer of the memory device.

16. The system of claim 15, wherein the data that is indicative of the completion of the machine-level instructions is copied to the command buffer of the host.

17. The system of claim 14, wherein the state machine comprises:
a plurality of direct memory access (DMA) controllers configured to retrieve the stored operands; and
a DMA controller configured to write a result of the arithmetic operation or the logical operation to the data buffer.

18. The system of claim 17, wherein the state machine further comprises:
a respective first in, first out (FIFO) buffer coupled to each of the plurality of DMA controllers; and
a FIFO buffer coupled to the DMA controller.

19. The system of claim 14, wherein the processing device is further configured to:
- determine whether the machine-level instructions have been executed by the state machine; and
- responsive to determining that the machine-level instructions have been executed, cause the command buffer of the memory device to store data indicative of the machine-level instructions being executed.

20. The system of claim 19, wherein the acceleration circuitry further comprises a circuitry that is configured to convert a data value formatted in a floating point format to the posit format.

21. The system of claim 14, wherein the memory device is configured to communicate with the host via a Peripheral Component Interconnect Express (PCIe) interface.

22. The system of claim 14, wherein the processing device comprises a cache coherent reduced instruction set computing device.

23. The system of claim 14, wherein the computation circuitry is configured to receive signals from the processing device and retrieve an operand stored in the data buffer based at least in part, on the received signals.

24. The system of claim 14, wherein the computation circuitry is configured to perform a dot product operation of a matrix multiplication operation defined by the instructions stored by the command buffer.

25. The system of claim 14, wherein the acceleration circuitry of the memory device is coupled to the data buffer, the command buffer, and a Peripheral Component Interconnect Express (PCIe) interface of the memory device, wherein the acceleration circuitry comprises:
- a direct memory access (DMA) controller;
- a first buffer coupled to the DMA controller and configured to store the first operand formatted in a posit format;
- a second buffer coupled to the DMA controller and configured to store the second operand formatted in the posit format; and
- processing circuitry coupled to the first and second buffers and configured to perform a scalar operation using the first operand and the second operand.

26. The system of claim 25, further comprising a plurality of registers coupled to the PCIe interface and the acceleration circuitry, wherein the plurality of registers are configured to store at least one of the first operand, the second operand, and a result of the scalar operation.

* * * * *